United States Patent [19]

Okada et al.

[11] Patent Number: 5,637,861

[45] Date of Patent: Jun. 10, 1997

[54] IMAGING APPARATUS HAVING IMPROVED RESOLUTION DUE TO CONTROL OF AN INCLINATION ANGLE OF A REFRACTING PLATE IN MORE THAN ONE DIRECTION

[75] Inventors: Hideo Okada, Uda-gun; Tohru Okuda, Nara; Masayuki Nishikawa, Higashiosaka, all of Japan

[73] Assignee: Sharp Kabushiki Kaisha, Osaka, Japan

[21] Appl. No.: 447,743

[22] Filed: May 23, 1995

[30] Foreign Application Priority Data

Jun. 20, 1994 [JP] Japan ................................. 6-137379
Apr. 13, 1995 [JP] Japan ................................. 7-088503

[51] Int. Cl.$^6$ ................................................. H01J 40/14
[52] U.S. Cl. ................................. 250/208.1; 359/557
[58] Field of Search ........................... 250/208.1, 201.4, 250/201.5, 201.8, 203.1, 203.4; 359/554–557, 823–824, 198–199; 244/165, 175, 177, 3.23, 3.24

[56] References Cited

U.S. PATENT DOCUMENTS

| 4,755,876 | 7/1988 | Dangler ................................ 358/264 |
| 5,107,293 | 4/1992 | Sekine et al. ........................ 359/554 |
| 5,214,513 | 5/1993 | Lee ........................................ 358/209 |
| 5,243,462 | 9/1993 | Kobayashi et al. ................. 359/557 |
| 5,289,318 | 2/1994 | Sekine et al. ........................ 359/813 |

FOREIGN PATENT DOCUMENTS

| 4031753 | 10/1990 | Germany. |
| 4034488 | 10/1990 | Germany. |
| 60-54576 | 3/1985 | Japan. |
| 61-251380 | 11/1986 | Japan. |
| 4211217 | 8/1992 | Japan. |
| 2175705 | 12/1986 | United Kingdom. |

OTHER PUBLICATIONS

Patent Abstracts of Japan; JP3264911, vol. 16, No. 75, Nov. 26, 1991.
Patent Abstracts of Japan: JP3231589, vol. 16, No. 11, Oct. 15, 1991.

*Primary Examiner*—Que Le

[57] ABSTRACT

A refracting plate is installed in the center of an actuator provided with a gimbaling mechanism element, which includes rotation supporting portions. A pair of voice coil motors are provided for each of the X- and the Y-axis in order to incline the refracting plate about the respective rotation supporting portions, and their own bobbins press the middle parts of the respective sides of the gimbaling mechanism element.

22 Claims, 21 Drawing Sheets

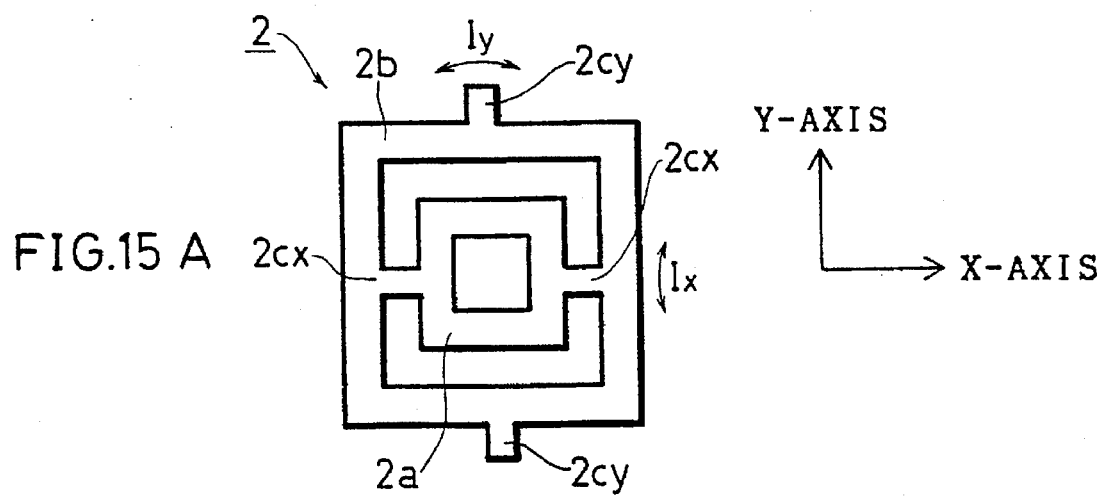
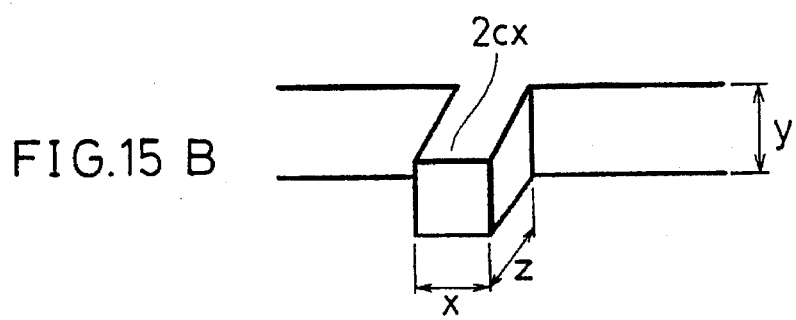
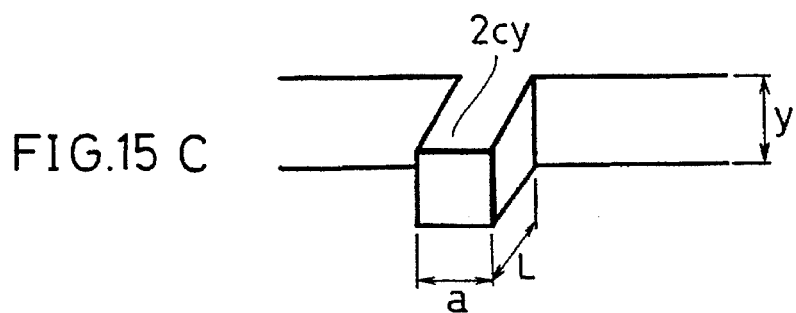

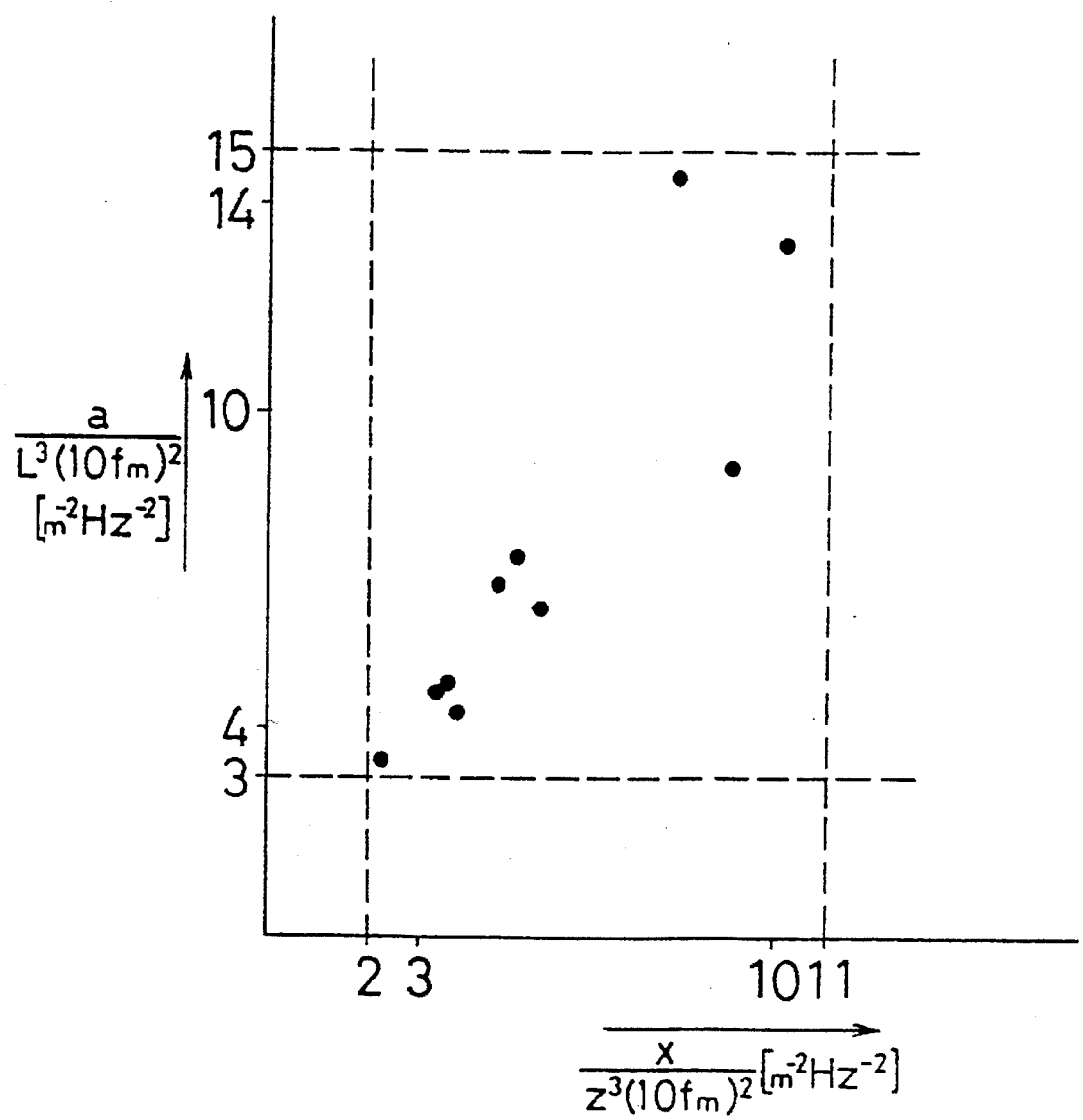

IMAGING APPARATUS HAVING IMPROVED RESOLUTION DUE TO CONTROL OF AN INCLINATION ANGLE OF A REFRACTING PLATE IN MORE THAN ONE DIRECTION

BACKGROUND OF THE INVENTION

1. Field of the Invention

The present invention relates to an imaging apparatus using a solid state imaging element and particularly to an improvement in the mechanism for enhancing resolution by shifting the imaging position of the light from the subject which enters the solid state imaging element, in a pixel arrangement direction in a light receiving plane nearly vertical to the axis of the incident light.

2. Description of the Related Art

Generally, the solid state imaging element such as a charge coupled device has a plurality of pixels arranged so as to form a two-dimensional matrix, and the resolution of an image is substantially determined by the number or pixels in the light receiving plane. Accordingly, all that is needed to achieve higher resolutions is to increase the number of pixels of the solid state imagine element, but from aspects of present techniques and costs the increase in number of pixels has its limit.

FIG. 25 illustrates the principle of the prior art disclosed in Japanese Unexamined Patent Publication JPA 60-54576 (1985) and Japanese Unexamined Patent Publication JPA 61-251380 (1986). A flat refracting plate 100a is interposed in the middle of the optical axis 100 of the light incident from a subject to a light receiving plane. When the refracting plate 100a is inclined by an angle θ from the state shown by a two-dot chain line vertical to the optical axis 100, the incident light 101 is displaced from the optical axis 100 by a shift Δ which is obtained by the following formula (1):

$$\Delta = t \cdot \sin\theta[1 - \{\sqrt{1-\sin^2\theta} / \sqrt{n^2-\sin^2\theta}\}] \quad (1)$$

wherein "t" and "n" are the thickness of the refracting plate, and the index of refraction of the glass which is a material of the refracting plate, respectively.

If the inclination angle θ of the refracting plate 100a is changed, it is possible to shift the imaging position of the incident light 101 from the subject in relation to the light receiving surface of the solid state imaging element in the horizontal and perpendicular directions of the pixel arrangement by an infinitesimal distance less than the pixel arrangement pitch. When a plurality of images obtained by shifting the incident light 101 are comprised on an image memory, then the number of the pixels of the solid state imaging element apparently increases, and images with higher resolutions can be obtained.

FIGS. 26, 27 are views showing the constitution of the prior art disclosed in Japanese Unexamined Patent Publication JPA 61-251380 (1987), that is, a sectional side view and a front view, respectively. The transparent flat refracting plate 100a made of a material such as glass is disposed between a lens 100b and a solid state imaging element 100c so as to traverse the optical axis 100 of the lens 100b. The refracting plate 100a is rectangular, in the center of each side of which is mounted a supporting member 100d having a L-shaped section, and a coil 100e is fixed on the longer side of each supporting member. A movement limiter 100f is provided on the shorter side of each supporting member so as to hold each supporting member 100d. A magnet 100m and a yoke 100y are arranged in the vicinity of each coil 100e. The movement limit 100f, magnet 100m and yoke 100y are fixed on the cabinet side of the imaging apparatus main body. An electromagnetic driving force is generated to the magnetic flux of the magnetic circuit which is formed between the magnet 100m and the yoke 100y, by the current in the coil 100e, acting as driving force to advance and retreat each coil 100e in a direction along the optical axis 100.

Now, it is assumed that one pair of adjacent coils 100e containing a corner are driven rightward along the optical axis and the other pair of coils 100e containing a corner are driven leftward along the optical axis. One of two corners confronting each other of the refracting plate 100a advances along the optical axis 100 and the other of the two corners retreats along the optical axis 100. The shorter sides of the supporting member 100d mounted on each side of the refracting plate 100a are respectively contacted to the move limiter 100f, and, as a result, the refracting plate 100a inclines to the optical axis 100 by a certain angle. In Japanese Unexamined Patent Publication JPA 60-54576 (1985), a piezoelectric element is used as an actuator instead of an electromagnetic actuator disclosed in Japanese Unexamined Patent Publication JPA 60-251380 (1985), and their fundamental constitutions are the same.

FIG. 28 is a view showing the constitution of a gimbaling mechanism as disclosed in Japanese Unexamined Patent Publication JPA 4-211217 (1992). In this prior art, two dimensional optical scanning is conducted using a gimbaling mechanism element. A first oscillator 200 includes a frame 201 which comprises a pair of rotation supporting portions 202, 203, in the center of which a reflection mirror 204 is installed. A second oscillator 205 includes a frame 206, and a pair of rotation supporting portions 207, 208, in the center of which the first oscillator 200 is installed. The rotation axis of the rotation supporting portions 202, 203 is at right angles to the rotation axis of the rotation supporting portions 207, 208. The first and second oscillators 200, 205 are independently rotated and oscillated about respective rotation axes by electrostatic force. When the reflection mirror 204 is exposed to the incident light from a subject in a state that the first and second oscillators 200, 205 are rotated and oscillated about the two orthogonal axes, the angle of the reflected light is altered and, as a result, the optical path can be changed. By applying this constitution, the resolution of the solid state imaging element can be enhanced like the case as shown in FIG. 25 where refraction of light is taken advantage of.

FIG. 29 is a view showing a simplified electrical constitution for screen composition aiming at enhancing the resolution. Memories 301–304 which have a storage capacity corresponding to the number of the pixels of the solid state imaging element are provided, and input signals representing an image formed by shifting the imaging position each period of four division frame periods T1–T4 are changed over to store the image data in the respective memories 301–301. When the image data from the respective memories 301–304 are composed in a memory 305, an image for one frame whose resolutions in the length and width directions are doubled can be obtained as a whole.

In the prior art as shown in FIGS. 26, 27, since the inclination angle θ of the refracting plate 100a depends on the traveling distance of the supporting member 100d until the shorter side of the supporting member 100d contacts with the movement limiter 100f, the inclination angle θ is determined by only one variable and thus it is difficult to select the desired resolution. In addition, there are some cases where the refracting plate 100a is required to be inclined a plurality of times within a short period, in which cases, if driven at high speeds, repeated contact between the movement limiter 100f and supporting member 100d may cause their wear, thus resulting in lowered precision of the inclination angle θ and further impairment of their durability. In addition, the noise which occurs at the time of contact grows to levels which are no longer negligible the driving speed increases.

Furthermore, in the prior art as shown in FIG. 28, the use of the two uniaxial oscillator results in an increased parts count, a complicated configuration and consequently poor assembling efficiency. Moreover, since the first oscillator 200 is secured to the second oscillator 205, the weight of the second oscillator increases, thus resulting in greater driving force due to the increased inertia moment.

As still another constitution mat be feasible such a constitution that the refracting plate is inclined by the couple of forces generated by a pair of voice coil motors facing across the axis of rotation. In such constitution, the difference in thrust between the pair of voice coil motors causes oscillation in the vertical direction to the refracting plate. When the oscillation gain is increased, the oscillation acts as disturbance to the circumference of the rotation axis in a control direction and the servo controllable range is thus limited.

SUMMARY OF THE INVENTION

The present invention has been accomplished to overcome the aforementioned problems, and is aimed to provide an imaging apparatus with a relatively simple constitution, the resolution of which may be selected as desired, and which is insusceptible to impairment even when driven at high speeds, operates with high accuracy in a stable manner and with low noise, and which has excellent durability.

The invention provides an imaging apparatus in which a refracting plate is arranged between a lens for condensing light from a subject and a solid state imaging element for imaging the subject and the refracting plate is inclined to shift the optical axis of incident light of the solid state imaging element in the arrangement direction of the solid state imaging element, the apparatus comprising:

- a gimbaling mechanism element wherein the refracting plate is installed and rotation supporting portions for supporting the refracting plate rotatably about two rotation axes in two directions at right angles to each other are formed in the respective edge areas of the refracting plate, and
- a plurality of voice coil motors wherein movable parts capable of advancing and retreating are connected to the respective edge areas of the refracting plate so as confront each other about the respective rotation axes the gimbaling mechanism element.

Further, the imaging apparatus of the invention is characterized in that the rotation supporting portions the gimbaling mechanism element are respectively shaped like a bobbin.

Further, the imaging apparatus of the invention may include a target value generating device for generating signals wherein target values for the inclination angle of the refracting plate are made different according to a preset resolution; an angle detecting device for detecting the inclination angle of the refracting plate; and a control device for comparing the target value represented by a signal output from the target value generating device and the inclination angle of the refracting plate detected by the angle detecting device and for controlling thrusts to advance and retreat the voice coil mothers according to the difference therebetween.

Further, the invention may further provide that the angle detecting device includes a light emitting element, and is set so that the light from the light emitting element which has been passed through or reflected on the refracting plate is applied to an invalid region beyond the subject imaging region of the solid state imaging element and that the inclination angle of the refracting plate is detected from the position of the light applied to the invalid region.

The imaging apparatus of the invention may include a movement vector detector for comparing the image data obtained at the current inclination angle of the refracting plate with the image data obtained at its immediately preceding inclination angle to arithmetically operate the movement vector between images and for outputting a signal for correcting the target value output from the target value generating device on the basis of the arithmetical operation result.

The imaging apparatus of the invention is characterized in that a frequency $f_m$ satisfies the following expressions:

$$2 \leq x/(10f_m)^2/z^3 \leq 11 (m^{-2}Hz^{-2})$$

and $$3 \leq a/(10f_m)^2/z^3 \leq 15 (m^{-2}Hz^{-2})$$

wherein "z" and "x" are respectively the length and width of the rotation supporting portions of the gimbaling mechanism element in one of the two directions at right angles to each other, namely the X-axis direction, and $f_x$ is the resonance frequency of the rotational oscillation about the X-axis; "L" and "a" are respectively the length and width of the rotation supporting portions in the other of the two directions, namely the Y-axis direction, and $f_y$ is the resonance frequency of the rotational oscillation about the Y-axis; and $f_m$ is the larger frequency of the resonance frequencies $f_x$, $f_y$.

The invention may further include a regular for making variable the thrust of at least one of the voice coil motors confronting each other through the respective rotation axes.

The invention may use voice coil motors of a moving coil type having the shapes of the sections thereof vertical to the movement directions of the coils be semicircular.

According to the invention, since the movable parts of the voice coil motors compose two pairs of parts opposed to each other about the rotation axes in two directions at right angles to each other, the inclination angle of the refracting plate is determined depending on the forward and backward movement of the movable parts of the driven voice coil motors in the optical axis direction. The resolution may be freely selected as desired, because the imaging position on the light receiving surface of the imaging element can be displaced by adjusting the forward/backward movement of the movable parts. In addition, since the refracting plate and gimgaling mechanism element do not undergo contact with other members even when the refracting plate is driven at high speed, the durability of the apparatus is excellent, and the accuracy of the inclination angle is stable over a long period. In addition, no noise is generated. Furthermore, since the imaging apparatus constructed as mentioned above uses a single gimbaling mechanism element, the number of parts may be reduced and the constitution may be simplified.

Further according to the invention, since the rotation supporting portions are formed into a bobbin shape, an increase in the spring constant of the gimbaling mechanism element in the optical axis direction may be achieved without depreciating the rotatability of the rotation supporting portions. Thereby, the occurrence of disturbance is restrained, with the result that controlling with high accuracy can be realized.

Further according to the invention, since the inclination angle of the refracting plate may be controlled depending on the set resolution, the resolution may be variable, which affords convenience to users.

Further according to the invention, the angle detecting means comprises a light emitting element from which light for detecting an angle is emitted. The light transmitted through or reflected on the refracting plate is received using an invalid region which is formed by arranging, at a position beyond the imaging region of a subject of the solid state imaging element, a light receiving element which is not used as a picture element for imaging. Since it is necessary to provide the angle detecting means with a dedicated light receiving element for receiving the light from the light emitting element separately, the imaging element can be reduced in size, resulting in lowering costs.

According to the invention, the image data obtained under the condition of the current inclination angle of the refracting plate and the image data obtained under the condition of the preceding inclination angle of the refracting plate are compared by the movement vector detector to arithmetically operate the movement vector between images, and the target value is corrected on the basis of the operation results. Thereby the change of the actuator depending on time is compensated with the result that stable operation can be realized over a long period.

Further, according to the invention, since the shape of the rotation supporting portions is selected so that the resonance frequency of rotational oscillation exists within an appropriate range, satisfactory servo characteristics can be established without interfering with rotation of the rotation supporting portions.

Further, according to the invention, since the refracting plate is inclined by the couple of forces generated by the voice coil motors facing across the axis of rotation, oscillation is caused in the direction vertical to the refracting plate when there is a difference in thrust between the two voice coil motors. However, since the resonance gain of oscillation can be decreased by controlling the thrust of a least one of the two voice coil motors, servo characteristics over a wide range can be established, resulting in stable control of the apparatus.

Further, according to the invention, since the voice coil motors are of a moving coil type and the shapes of the sections vertical to the moving directions of the coils thereof are semicircular, a sufficient space is ensured between the voice coil motors by arranging the circular arc sides of the voice coil motors on the outer side. The solid state imaging element is arranged in the space to make the imaging apparatus small in size as a whole.

BRIEF DESCRIPTION OF THE DRAWINGS

Other and further objects, features, and advantages of the invention will be more explicit from the following detailed description taken with reference to the drawings wherein:

FIGS. 15A–15C are a plan view and partially enlarged perspective views of the gimbaling mechanism element of the embodiment of FIG. 1;

FIG. 20 is a diagram in which satisfactory examination results regarding servo characteristics are plotted;

DETAILED DESCRIPTION OF THE PREFERRED EMBODIMENTS

Figure 1:
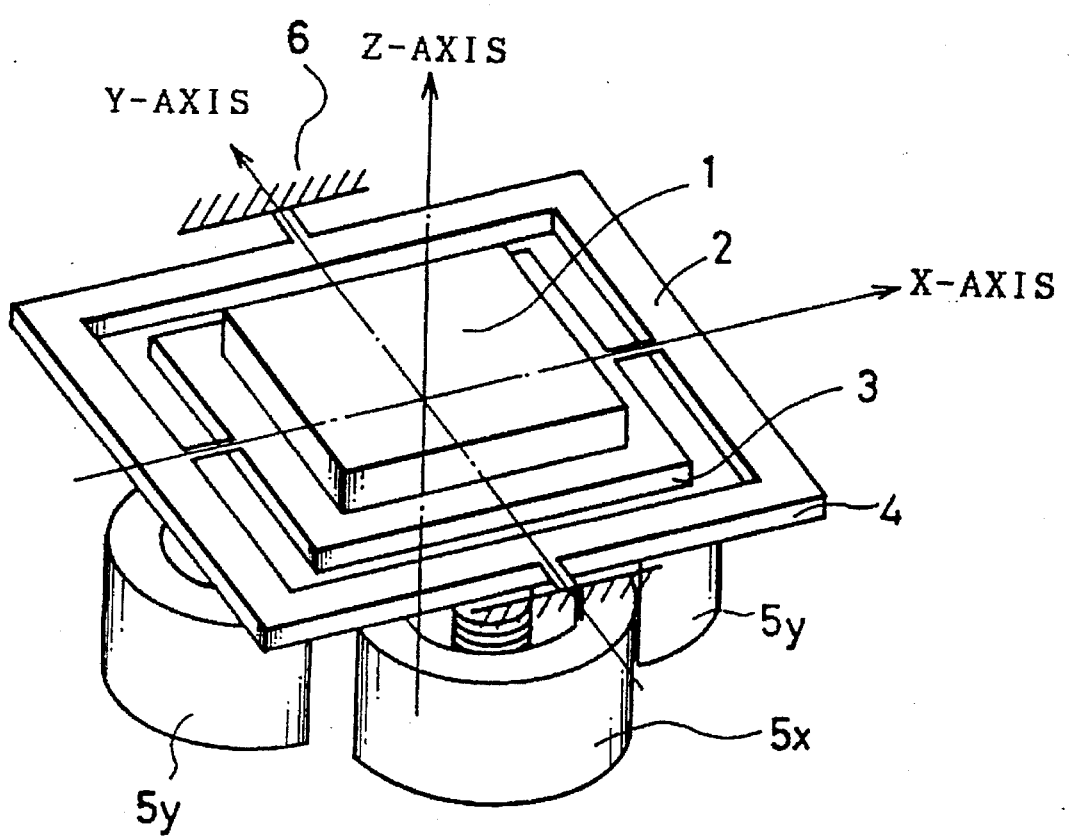
FIG. 1 is a perspective view of an actuator part of an imaging apparatus of an embodiment of the invention.

Now referring to the drawings, preferred embodiments of the invention are described below.

Figure 2:
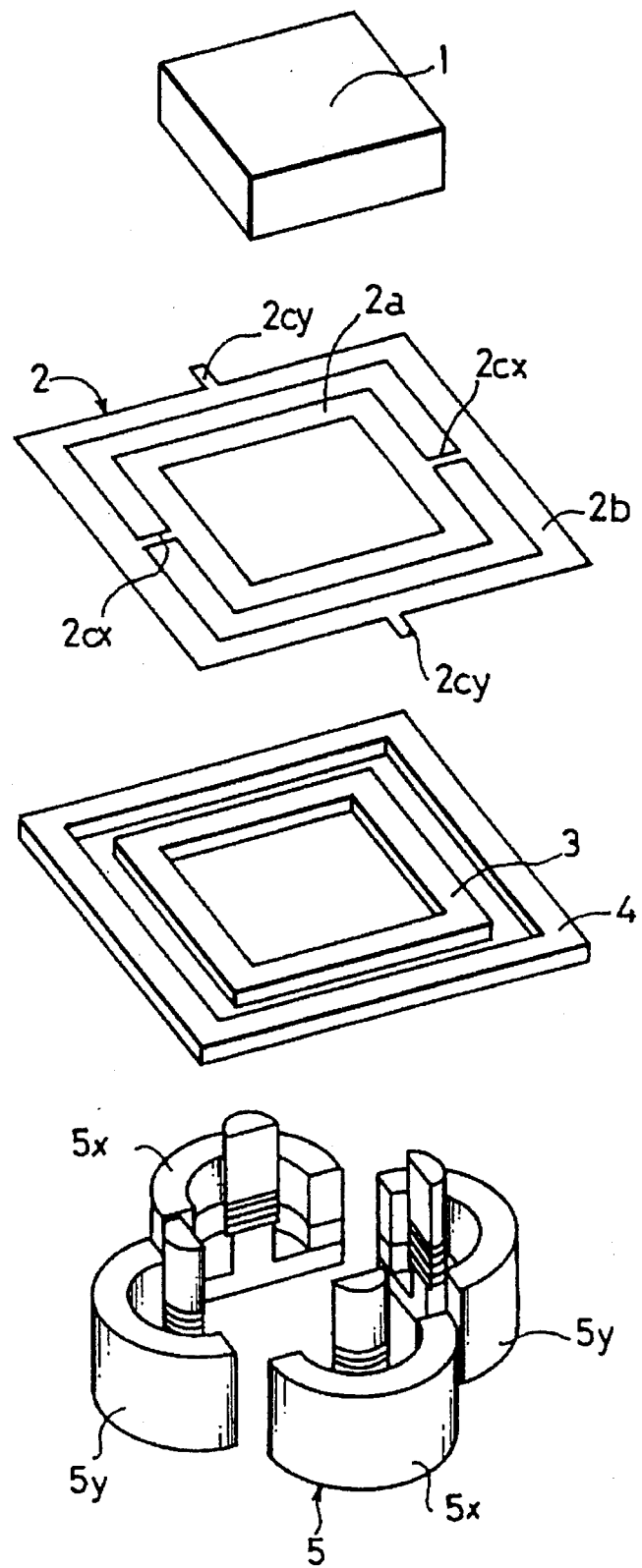
FIG. 2 is an exploded perspective view of the actuator part of the embodiment of FIG. 1.

FIG. 1 is a perspective view showing an actuator part for inclining a refracting plate of an imaging apparatus of an embodiment of the invention, and FIG. 2 is an exploded perspective view of the actuator part. The refracting plate 1 is made into a plate form of a transparent material such as glass, acrylic resin or the like, having a rectangular section. In order to minimize inertia such as inertia moment, it is preferable that the refracting plate 1 is as light as possible. The gimbaling mechanism element 2 is integratedly formed in such a manner that etching or the like is applied to a metal thin plate having a high elastic modulus, and comprises an inner frame part 2a and an outer frame part 2b. Two virtual axes which are at right angles to each other and which pass through the midpoints of the respective opposite sides of the inner frame part 2a and outer frame part 2b defined as the X-axis and Y-axis. Rotation supporting portions 2cx are provided at the positions or both ends of the X-axis between the inner frame part 2a and outer frame part 2b, namely right and left positions of the X-axis, and rotation supporting portions 2cy are provided at the positions of both ends of the Y-axis in the outer frame part. The respective rotation supporting portions 2cx, 2cy are formed to have much smaller widths than the respective widths of the inner frame part 2a and outer frame part 2b. Thereby the gimbaling mechanism element 2 is allowed to biaxially rotate about the X-axis and Y-axis passing through the centers of the cross sections of the respective rotation supporting portions 2cx, 2cy.

Inner and outer reinforcing plates 3, 4 are bonded and fixed to the inner and outer frame parts 2a, 2b, respectively. The respective reinforcing plates 3, 4 are made of a synthetic resin or light metal and shaped to be correspond the shapes of the inner and outer frame parts 2a, 2b. The respective reinforcing plates 3,4 are set to be much thicker than the gimbaling mechanism element 2. A refracting plate 1 is inserted and fixed inside the inner frame part 2a of the gimbaling mechanism element 2 and the inner reinforcing plate 3.

By fixing the respective reinforcing plates 3, 4 to the gimbaling mechanism element 2 in this manner, the gimbaling mechanism element 2 is reinforced and the freedom of the gimbaling mechanism element 2 regarding movement other than rotation about the X- and the Y-axis is restricted. Accordingly the spring characteristics of the gimbaling mechanism element 2 depend on solely the shape and rigidity of the rotation supporting portions 2cx, 2cy. The method of designing the rotation supporting portions 2cx, 2cy will be detailed below.

In this connection, defining as Z-axis an axis passing through the intersection of the X- and the Y-axis and being at right angles to the respective axes, a lens which condenses reflected light from a subject is arranged at an upper position of the refracting plate 1 so that its optical axis corresponds to the Z-axis. A voice coil motor 5 is arranged on the lower side of the Z-axis, and further at a lower position thereof a solid state imaging element is arranged so that its light receiving surface intersects the Z-axis and is at right angles to the Z-axis. If the reinforcing plates 3, 4 are made as light as possible, the inertia around the X- and the Y-axis become small, and conveniently the thrust of the voice coil motor 5 may be small. Both ends of each rotation supporting portion 2cy formed on the Y-axis are connected to a cabinet 6 of the imaging apparatus.

Figure 3:
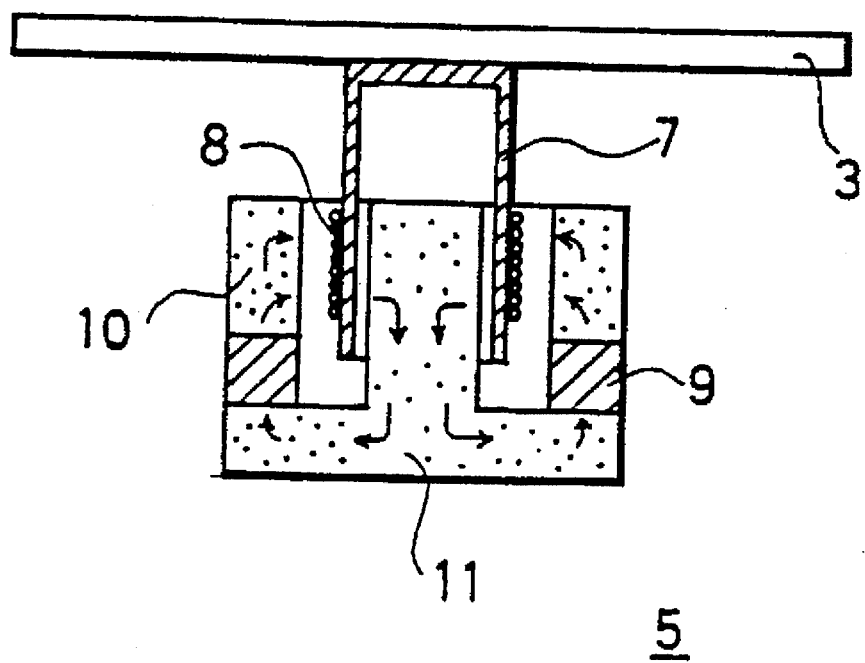
FIG. 3 is a longitudinal sectional view of a voice coil motor of the embodiment of FIG. 1.

The voice coil motors 5 consist of two pairs positioned around the Z-axis, one of which arranged in the X-axis direction and the other of which is arranged in the Y-axis direction. The voice coil motors between which the X-axis is placed are designated with 5x, and those between which the Y-axis is placed are designated with 5y. Additionally all the voice coil motors are generally designated with a reference numeral 5. According to the embodiment, each voice coil mother 5 is of a moving civil type (MC type) with the configuration as shown in FIG. 3. Movable parts of the voice coil motor 5 is composed of a bobbin 7 and a coil 8 wound around the outer circumferential surface of the base end of the bobbin 7. The bobbin 7 and coil 8 are formed into a semicircular shape in its plan view so as not prevent incidence of the light reflected from the subject onto the solid state imaging element via the refracting plate 1. The coil 8 is suspended in a magnetic cap in a magnetic circuit composed of a magnet 9 and yokes 10, 11. The magnet 9 and yoke 10 are semiarc-shaped corresponding to the bobbin 7 and coil 8 and the yoke 11 has a semi-circular column portion in its center area. The semi-circular column portion in the center of the yoke 11 is inserted into the base end of the bobbin 7. A magnetic path as indicated by arrows in FIG. 3 by the magnetic circuit. The four voice coil motors 5 are arranged so that the respective arc sides of the semicirculars are positioned on the outer side and have spaces inside.

The bobbins 7 of the respective venice coil motors 5 are bonded securely to the midpoints of the respective sides of the inner reinforcing plate 3. Accordingly one pair of voice coil motors 5y and the other pair of voice coil motors 5x are positioned along the X-axis and Y-axis, respectively. Now, such a case is supposed that currents in the opposite directions to each other are fed through the respective coils 8 confronting to each other of any one of the pairs of voice coil motors 5x, 5y to drive the motor. One bobbin 7 moves upward along the yoke 11, while the other bobbin 7 moves downward along the yoke 11. As a result a couple of forces are exerted on the inner reinforcing plate 3 to rotate the gimbaling mechanism element 2 about the respective rotation supporting portions 2cx, 2cy, and thus incline the refracting plate 1 about the X-axis or Y-axis by the rotation. Additionally the voice civil motor 5 is preferred to be of MC type for the purpose of reducing the whole apparatus in weight and other type such as moving magnet type (MM type) may be applied.

Figure 4:
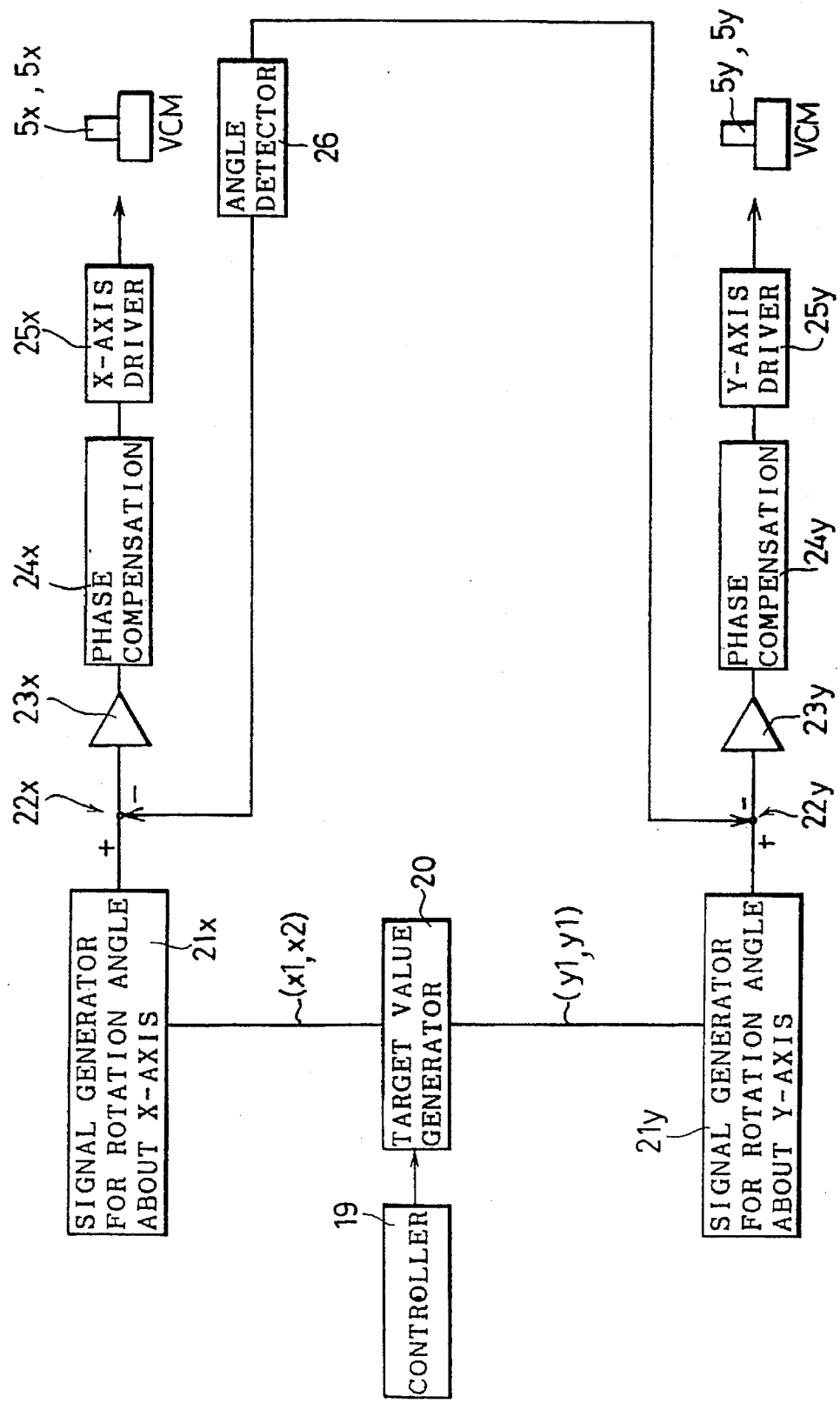
FIG. 4 is a block diagram showing the schematic electrical configuration of a control circuit part for controlling the actuator part in the embodiment of FIG. 1.
Figure 5:
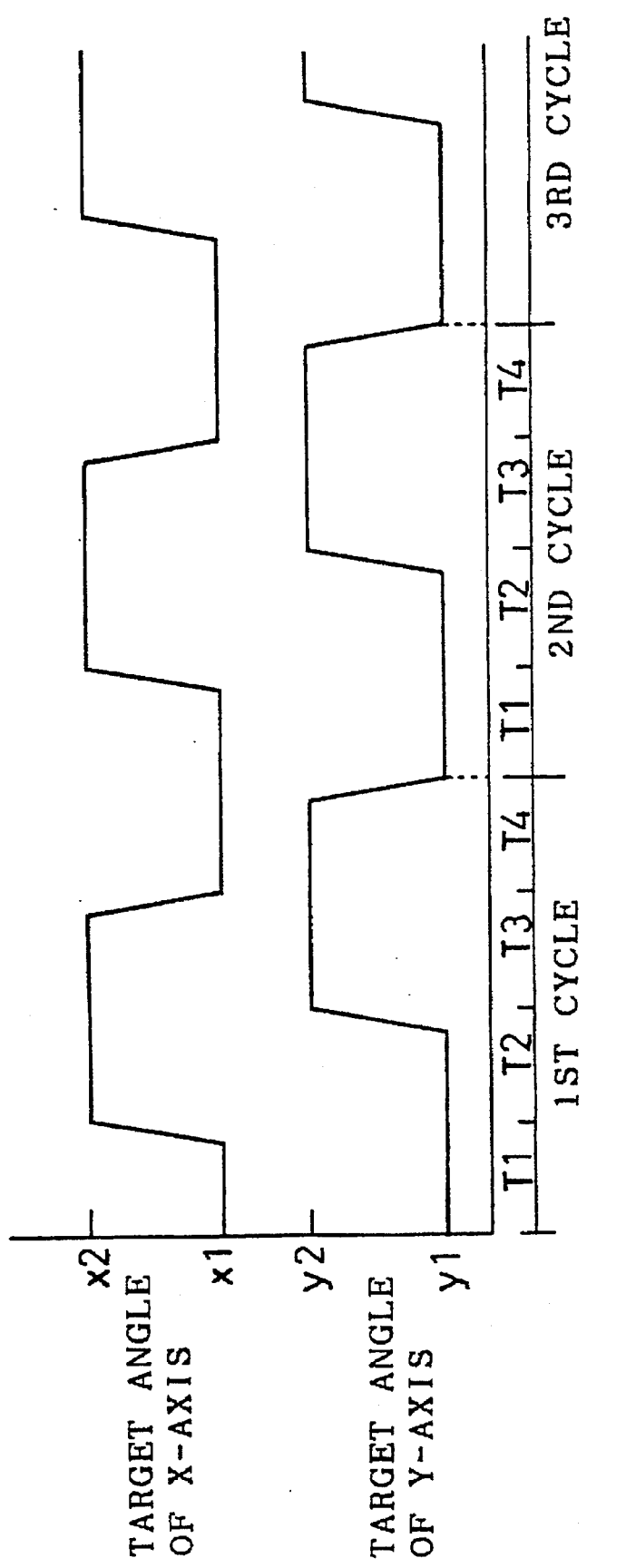
FIG. 5 is a timing chart showing output waveforms of a signal generator for rotation angles about an X- and a Y-axis, respectively, which constitutes the control circuit part of FIG. 4.

FIG. 4 is a block diagram showing the configuration of a control circuit part for driving an actuator part as shown in FIGS. 1–3. A mode control signal is fed from a controller 19 to a target value generator 20. The target value generator 20 generates target values for rotation angles about the X- and the Y-axis of the refracting plate 1, respectively, on the basis of input mode control signals. Signal generators 21X, 21Y for rotation angles about the X-axis respectively generate signals for rotation angles about the X- and the Y-axis, having periodic waveforms, as shown in FIG. 5 on the basis of the target values for the rotation angles about the X- and the Y-axis from the target value generator 20. Comparison circuits 22x, 22y compare the rotation angle signals as control targets from the signal generators 21x, 21y for rotation angles about the X- and the Y-axis, with detection signals of the rotation angles about the X- and the Y-axis of the refracting plate 1, and output signals representing the differences therebetween. Amplifiers 23x, 23y amplify output signals from the comparison circuits 22x, 22y, respectively. Phase compensation circuits 24x, 24y compensate the phases of the signals output from the amplifiers 23x, 23y, respectively to prevent oscillation. X- and Y-axis drivers 25x, 25y drive the respective voice coil motors 5x, 5y for the rotation about the X- and the Y-axis, respectively. An angle detector 26 detects rotation angles about X- and the Y-axis of the refracting plate 1 to feed detection signals to the comparison circuits 22x, 22y.

Now, such a case is supposed that a mode control signal for settling a twice as high resolution is input from the controller 19. From the target value generator 20 are generated respective target values x1, x2, y1, y2 for the respective rotation angles about the X- and the Y-axis of the refracting plate 1 as shown in FIG. 5. Hereupon the horizontal and vertical pitches of the respective pixels of the solid state imaging element are designated with PX and Py. In order to obtain an image of the twice as high resolution, it is required to shift the imaging position of the subject by Px/2 in the horizontal direction and by Py/2 in the vertical direction. When one set of target values x1, y1 are assumed as, for example, 0, from the above equation (1) the other set of target values x2, y2 are given on the basis of an angle θ satisfying the following equation (2):

$$Px/2, Py/2 = t \cdot \sin\theta[1 - \{\sqrt{1-\sin^2\theta} / \sqrt{n^2 - \sin^2\theta}\}] \quad (2)$$

The target values x1, x2 with respect to the X-axis and the target values y1, y2 with respect to the Y-axis are then fed to the signal generator 21x for the rotation angle about the X-axis and the signal generator 21y for the rotation angle about the Y-axis, respectively. The signal generator 21x for the rotation angle about the X-axis generates signals for the rotation angle about the X-axis, having periodic waveforms with respect to the X-axis as shown in FIG. 5, on the basis of the target values x1, x2 from the target value generator 20. Likewise, the signal generator 21y for the rotation angle about the Y-axis generates signals for the rotation angle about the Y-axis, having periodic waveforms with respect to the Y-axis as shown in FIG. 5, on the basis of the target values y1, y2 from the target value generator 20. Incidentally, the waveform of the signal for the angle of rotation about the X-axis and that of the signal for the angle of rotation about the Y-axis have a 90° phase shift. The phase shift allows to minimize the driving frequencies about each axis to move to four positions in a repeated manner, and consequently to reduce in power consumption.

When the respective signal generators 21x, 21y for the rotation angles about the X- and the Y-axis generate signals for the rotation angles as shown in FIG. 5, the comparison circuits 21x, 21y compare these signals for the rotation angles as the control values with detection signals for the rotation angles about the X- and the Y-axis which are output from the angle detector 26, and output signals which reflect the differences between the two associated signals. These difference signals are amplified through the amplifiers 23x, 23y, pass through the phase compensation circuits 24x, 24y and are then input to the respective drivers 25x, 25y for the X- and the Y-axis. The drivers 25x, 25y feed driving currents in opposing directions to coils 8 of the pair of opposite voice coil motors 5x, 5y. Thereby the refracting plate 1 is inclined about the X- and the Y-axis, and these inclination angles are detected by the respective angle detectors 26. Then, the detection outputs are input to the comparison circuits 22x, 22y, and thus rotation angles of the refracting plate 1 are fed back to be controlled so as to correspond to the target angles x1, x2, y1, y2.

Figure 29:
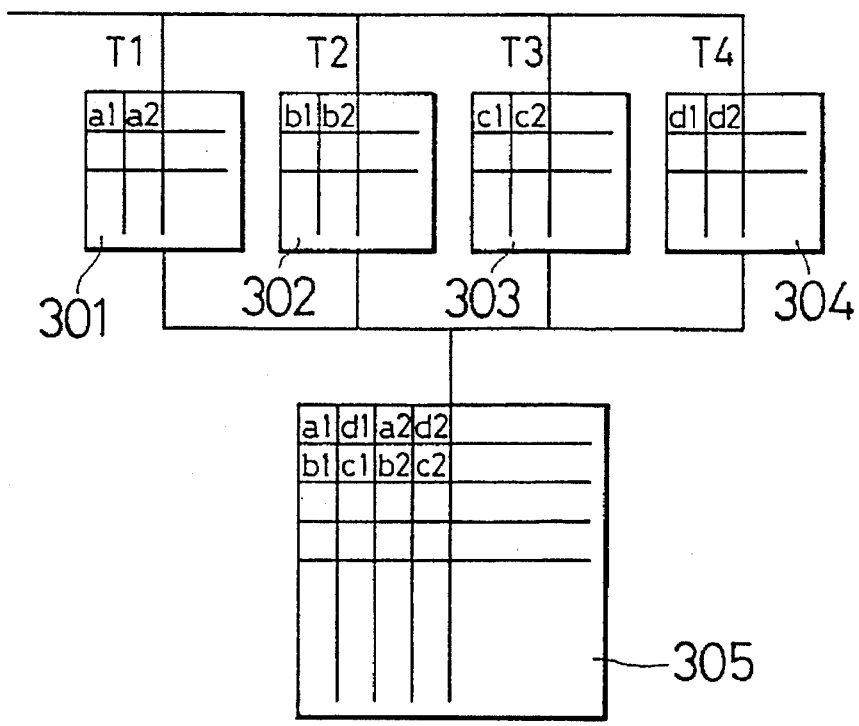
FIG. 29 is a block diagram showing an electrical constitution in which high resolution can be achieved.

Here, in FIG. 5 one cycle period is an interval of time required to set the refracting plate 1 to the positions of a total of four angles, namely, which are determined by combination of two rotation angles of the refracting plate 1 about the X-axis and two rotation angles of the refracting plate 1 of the Y-axis. Specifically, the angles are set to become (x1, y1), (x2, y1), (x1, y2) and (x2, y2) in periods T1, T2, T3 and T4 within one cycle period, respectively. The image outputs of the subject picked up by the solid state imaging element in the respective periods T1–T4 are written into memories as shown in FIG. 29, and the data for four frames output from each memory are composed to obtain an image with a resolution which is roughly doubled both horizontally and vertically.

Likewise, in the case where a mode control signal for setting a quadruple resolution is input, it is required to shift the image on a Px/4 basis horizontally and on a Py/4 basis vertically wherein Px and Py are horizontal and vertical pitches of the respective pixels of the solid state imaging element. For one cycle period, the refracting plate 1 is set to be at a total of sixteen combination positions of rotation angles, namely four angular positions about the X-axis and four angular positions about the Y-axis. Composing the data for sixteen frames of the subject which are picked up by the solid state imaging element, an image with a resolution which is roughly quadruple both horizontally and vertically.

In the case where a normal mode control signal is input from a controller 19, target values x, y for a given rotation angle are output from the target value generator 20. Therefore, the inclination angle of the refracting plate 1 is held at a given angle without being changed. For example, in the case where the target values x=0, y=0, the refracting plate 1 is maintained in a state that it is at right angles to the optical axis (Z-axis). Accordingly, the composition of frames is not executed, and the image picked up by the solid state imaging element is directly output.

Figure 6:
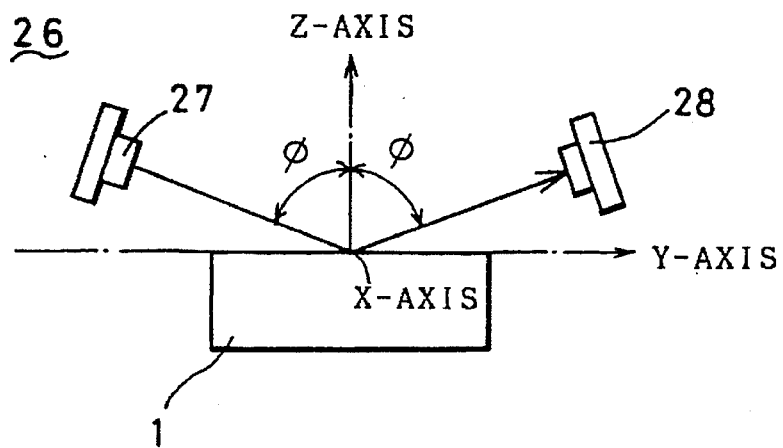
FIG. 6 is a side view showing an arrangement of an angle detector of the embodiment of FIG. 1.
Figure 7:
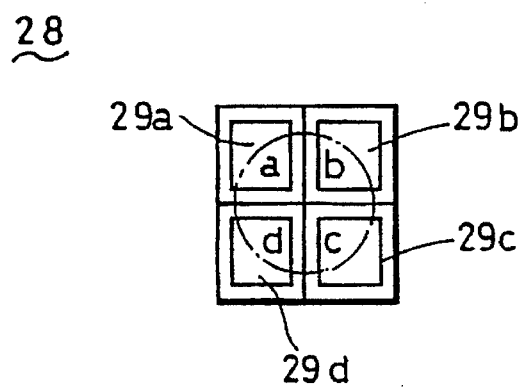
FIG. 7 is a front view of the light receiving portion of the angle detector of FIG. 6 when viewed from a light incidence end.

An explanation will now be given regarding the concrete configuration of the angle detector 26 used in the control circuit part as shown in FIG. 4 which drives the actuator part. FIG. 6 is a side view of the angle detector which shows its configuration, and FIG. 7 is a front view of the light receiving portion of the angle detector when viewed from the light incidence end. In FIG. 6, the vertical direction, the lateral direction and the direction orthogonal to the plane of the paper correspond to the Z-axis direction, the Y-axis direction and the X-axis direction, respectively. This angle detector 26 comprises a light emitting portion 27 and a light receiving portion 28, wherein the light emitting portion 27 is composed of a light emitting device such as an LED, while the light receiving portion 28 is composed of four light receiving elements such as phototransistor, as a so-called four-part- split photodetector.

The light emitting portion 27 is positioned so that the light emitted therefrom enters the center position where the refracting plate 1 intersects the z-axis of the refracting plate 1, at an angle of θ. The light receiving portion 28 is positioned on the path of the light reflected by the refracting plate 1, which has been emitted from the light emitting portion 27, and both the light emitting portion 27 and the light receiving portion 28 are fixed to a part of a cabinet of the solid state imaging element. In order to guide the light from the light emitting portion 27 to the light receiving portion 28 with high efficiency, it is preferred to additionally provide a condensing lens, a collimator lens or the like.

Assuming that the refracting plate 1 is positioned at an angle where the refracting plate 1 is at right angles to the optical axis (Z-axis), without being inclined the light from the light emitting portion 27 is equally applied to the four light receiving elements 29a–29d of the light receiving portion, as indicated by the alternate long and short dash line in FIG. 7. When the additive signal of the detection outputs of a pail a of right and left light receiving elements 29a, 29b is designated with $X_1$, the additive signal of the detection outputs of the other pair of right and left light receiving elements 29c, 29d with $X_2$, the additive signal of the detection outputs of a pair of upper and lower light receiving devices 29a, 29d with $Y_1$ and the additive signal of the detection outputs of the other pair of upper and lower light receiving elements 29b, 29c with $Y_2$, all the difference signals $(X_1-X_2)$ and $(Y_1-Y_2)$ are 0.

In the case where the refracting plate 1 is rotated about the X-axis initially in the aforementioned state, the light from the light emitting portion 27 cannot be equally applied to the respective light receiving devices 29a–29d of the light receiving portion 28, and the additive signal $X_1$ of the detection outputs of the pair of right and left light receiving devices 29a and 29b and the additive signal of the detection outputs of the other pair of right and left light receiving devices 29c and 29d have different values. Therefore, the difference signal $(X_1-X_2)$ which reflects the difference between the two values cannot be 0, and a detection output which depends on the rotation angle is produced.

Figure 8:
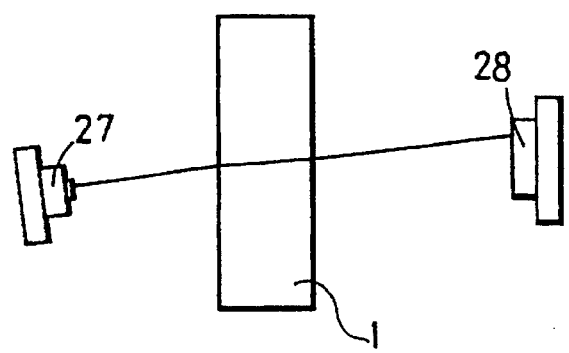
FIG. 8 is a side view showing another arrangement of an angle detector of another embodiment of the invention.

Additionally, the aforementioned angle detector 26 is designed so that the light receiving portion 28 receives the light from the light emitting portion 27 after being reflected by the refracting plate 1; nevertheless, as shown in FIG. 8, the light emitting portion 27 and light receiving portion 28 may be located across the refracting plate 1 so that the light receiving portion 28 receives the light which has been emitted from the light emitting portion 27 and has passed through the refracting plate 1. In this case, however, the angle detector 26 must be adjusted for the geometric configurational relationship between the light emitting portion 27 and light receiving portion 28 in order not to obstruct the incidence of the light from the subject onto the solid state imaging element.

Although the angle detector 26 has the light receiving portion 28 provided separatedly from the solid state imaging element, the solid state imaging element itself may also be made to work as the light receiving portion.

Figure 9:
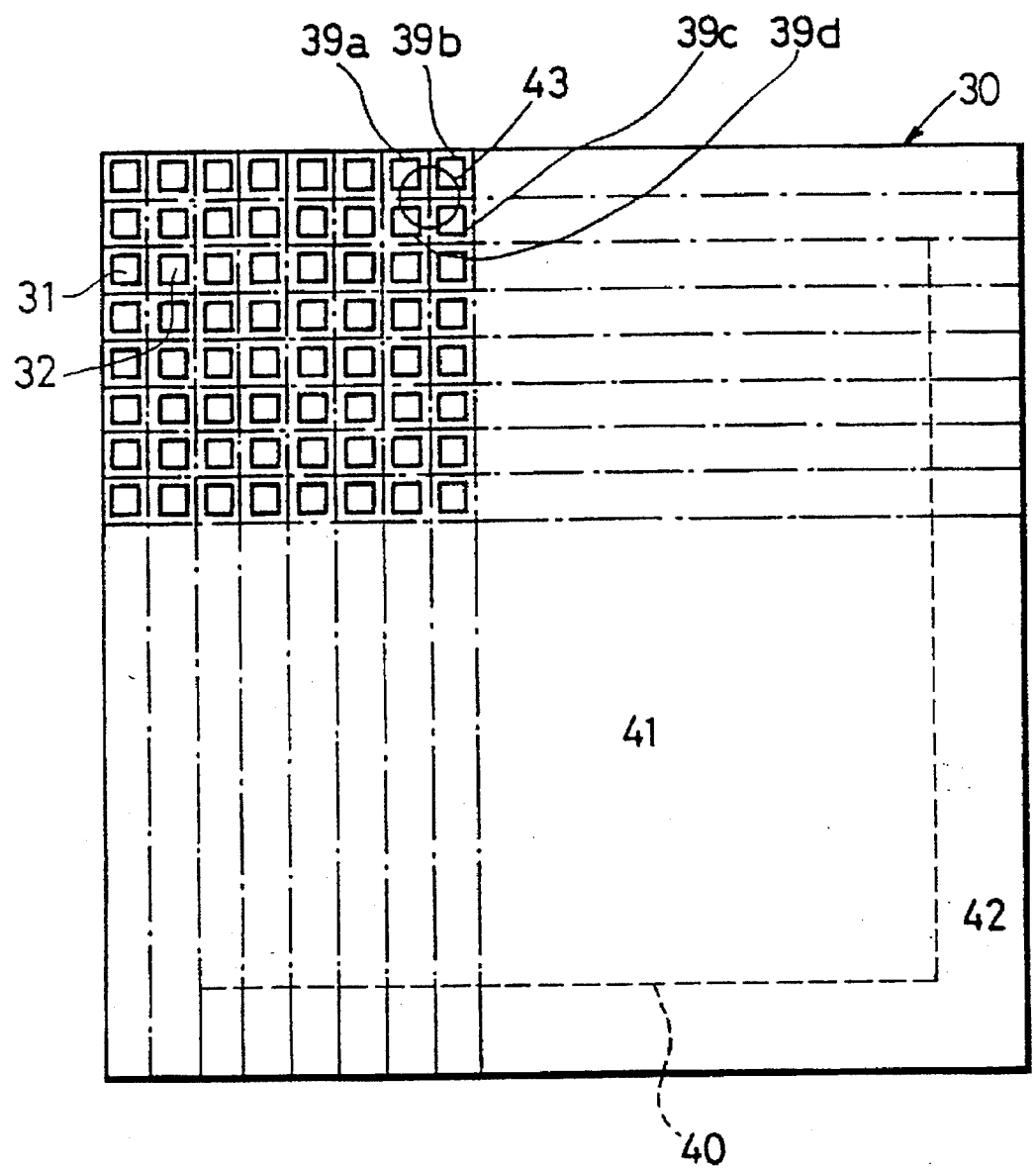
FIG. 9 is an enlarged plan view of a solid state imaging element of the embodiment of FIG. 1.

FIG. 9 shows the constitution of a solid state imaging element, wherein no special-purpose light receiving portion is provided, and the solid state imaging element is also designed to work as a light receiving portion instead. The solid state imaging element 30 comprises a matrix of light receiving elements 31–38, 39a–39d arranged horizontally and vertically, which form pixels, wherein the light from the subject enters only the imaging region 41 boxed by the broken line of the figure; the outer region of a boundary line is an inoperative region 42 which does not directly take part in imaging. The inoperative region 42 is generally called an optical block. The light receiving elements of the optical block region are shielded from light by applying aluminum or the like thereto and environmental effects of temperature, humidity, and the like on the solid state imaging element 30 can be corrected by obtaining the difference between the output of the pixels of the imaging region 41 and the average output of the pixels of the inoperative region 42. Additionally, regarding the optical block, there are 20–40 pixels per horizontal line. Since practically the average of the while light receiving elements of the optical block may be obtained as mentioned above, no problematic bad influence results even when about two elements are used as sensors. However, since the light receiving elements of the optical block are shielded from light in the general solid state imaging element, it is necessary to provide a not-shielded region by masking or the like in advance.

Accordingly, the optical system is adjusted so that light receiving elements 39a–39d constituting a part of the inoperative region 42 formed in such manner are constructed as the light receiving portion and so that light from the light emitting portion 27 passes through the refracting plate 1 and enters the light receiving devices 39a–39d. Also in this case, the detection of the respective amounts of light received by the light receiving devices 39a–39d serves to detect the inclination angles of the refracting plate 1 in the same manner as that of the above-mentioned light receiving portion 28. Furthermore, since there is no need to provide a dedicated separate light receiving portion 28 for receiving light from the light emitting portion 27, the cost may be lowered by its omission.

Here, it is to be noted that the angle detector 26 may be a reflection type photointerrupter or non-contact displacement sensor, or it is possible to measure the displacement of the refracting plate 1 to convert an angle by providing the refracting plate 1 with a lightshielding flag and using a transmitting type photointerrupter.

Figure 10:
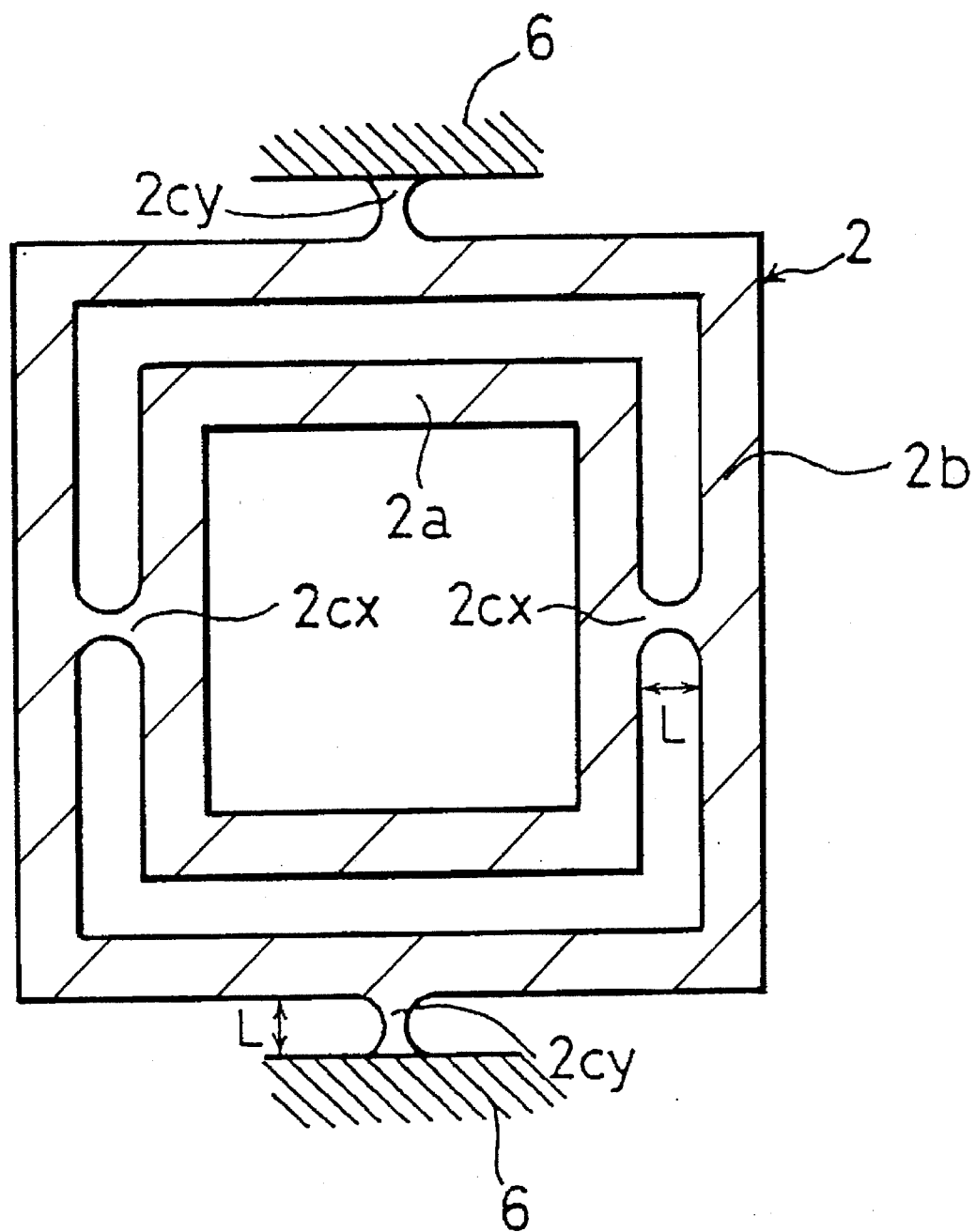
FIG. 10 is a plan view showing the form of a gimbaling mechanism element of another embodiment of the invention.

FIG. 10 shows the shape of a gimbaling mechanism element of another embodiment of the invention. In the embodiment since the parts of the embodiment corresponding to those of the embodiment as shown in FIG. 1, 2 are designated with the same reference numerals, the description will be eliminated. In the gimbaling mechanism element as shown in FIGS. 1, 2, all the rotation supporting portions 2cx, 2cy of the gimbaling mechanism element 2 are rectangular-shaped in cross section, but more preferably are bobbin shaped. Here, the term "bobbin shaped" means that the width of the center portion is gradually reduced in comparison with that of both ends.

The reason why such shape is preferred is that while the oscillation in the Z-axis direction only constitutes unwanted disturbance to the components of rotation about X-axis and Y-axis, the unwanted oscillation around the Z-axis may be undoubtedly suppressed by employing the bobbin shape. Simply speaking, while the lengths L of the respective rotation supporting portions 2cx, 2cy of the rectangle as shown in FIGS. 1, 2 may be shortened to increase their spring constants, the torsional rigidity increases adversely in the case where the lengths L of the rotation supporting portions are excessively short, and as a result increased driving force is required for rotation of the refracting plate 1 about the X- and the Y-axis. On the other hand, in the case where the rotation supporting portions are bobbin shaped, their lengths L may be shortened to equivalently increase their spring constants without increasing their torsional rigidity, and therefore the refracting plate 1 may be rotated about the X- and the Y-axis by a relatively small driving force while suppressing the unwanted oscillation in the Z-axis direction. Such bobbin shaped gimbaling mechanism element 2 is easily formed by etching in the case where it is made of a material such as a metal, and thus the cost increase caused by employing such shape is extremely small.

Figure 11:
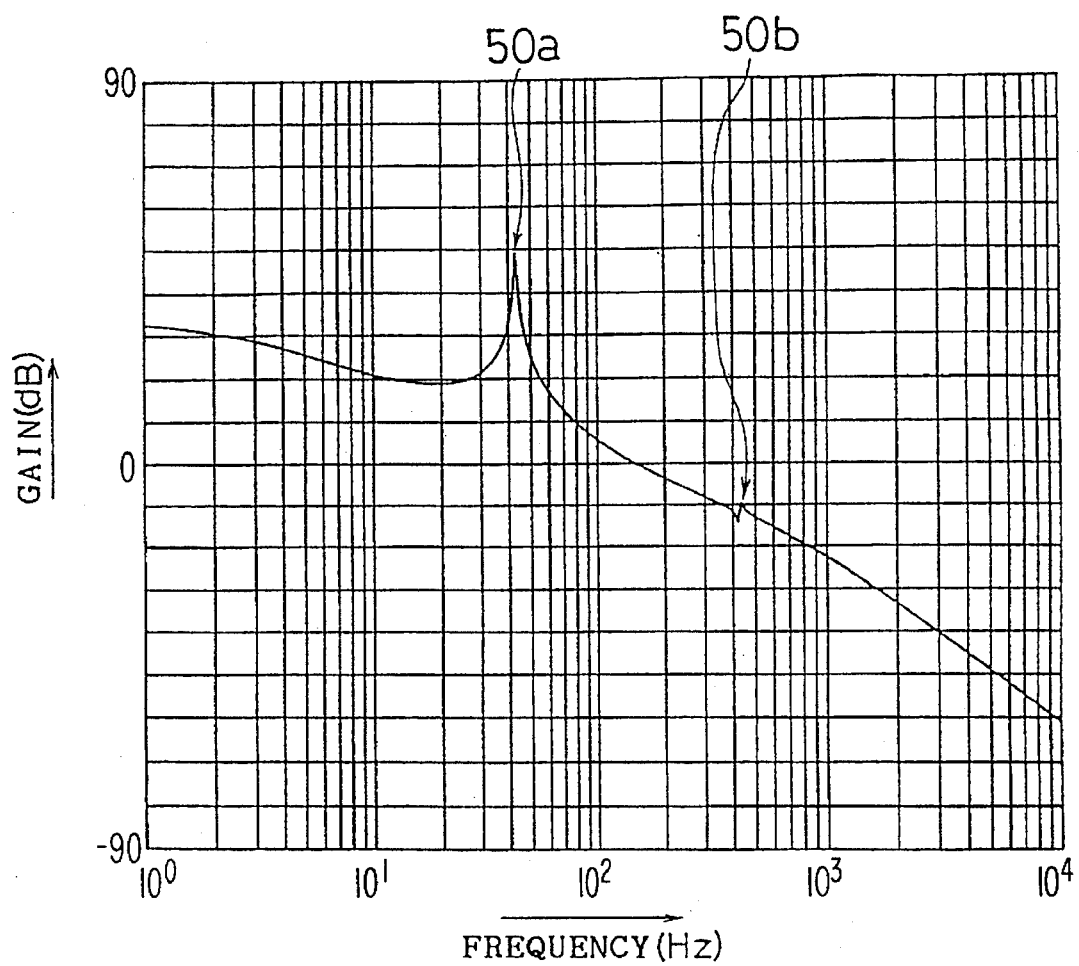
FIG. 11 is a Bode diagram showing servo characteristics of the actuator part of the embodiment of FIG. 1.

Next, an explanation will be given regarding the details of designing the rotation supporting portions 2cx, 2cy. Servo characteristics preferable as to controllability of the embodiment shown in FIGS. 1, 2 or FIG. 10 are shown as a Bode diagram in FIG. 11. In FIG. 11, the axis of ordinate indicates gains (dB) and the axis of abscissa indicates frequencies (Hz). The peak designated with 50a indicates the resonance of rotational oscillation in the rotation supporting portions 2cx, 2cy of the gimbaling mechanism element 2 and the frequency is 43 Hz. The peak designated with 50b indicates the resonance of oscillation in the Z-axis direction and the frequency is 430 Hz. In other words, ten times the resonance frequency at the peak 50a is the resonance frequency at the peak 50b. This means that in the case where the resonance frequency of oscillation in the Z-axis direction is ten times or less the resonance frequency of rotational oscillation of the rotation supporting portions, the gain margin becomes 10 dB or less which causes unstable control. Accordingly, the entire structure must be constructed in such a manner that the resonance frequency of oscillation in the Z-axis direction is ten times or more the resonance frequency of the rotational oscillation.

When in consideration of the resonance frequency of each oscillation and the above-mentioned matters, the shapes of the rotation supporting portions are ones within a certain scope, it becomes possible to satisfy the abovementioned requirements and establish stability of servo controlling. Now, fundamental view points regarding the relationship between the shape of the rotation supporting portions and the resonance frequency will be described, giving an example of tordion of a rectangular section for obtaining the resonance frequency and a maximum of generated shear stress.

Figure 12:
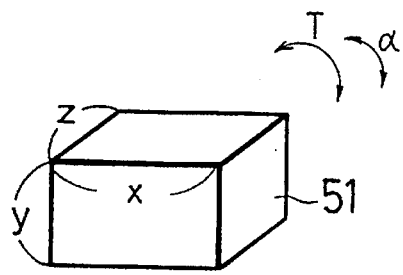
FIG. 12 is a perspective view schematically showing the shape of a rotation supporting portion.

An explanation for the case where $x \geq y$ will be given with reference to the rectangle shown in FIG. 12, wherein "x", "y", "z", "E", "ν" and "α" are the width, thickness, length, Young's modulus, the Poisson's ratio, and tordion angle, respectively. An approximate equation based on the theory of elasticity for the torsional-moment "T" which is required when torsion is exerted about an axis vertical to the section of the rectangle is expressed as an equation (3). When the spring constant at the time of the rotational oscillation is expressed as "K", $T = \alpha K$, and the resonance frequency "f" of the rotational oscillation is expressed as an equation (4) considering the moment of inertia "I" and the spring constant "K" at the time of the rotational oscillation. An approximate equation based on the theory of elasticity for a maximum shear-stress when the torsion angle is α, is given as an equation (5). A change in "x" and "y" in the equations (3)–(5) holds for those equations in those of "x""y". case of x<y.

$$T = \frac{\alpha}{z} \left\{ \frac{1}{3} \cdot \frac{E}{2(1+v)} \cdot xy^3 - \frac{64}{\pi^5} \cdot \frac{Ey^4}{2(1+v)} \cdot \tanh\left(\frac{\pi}{2} \cdot \frac{x}{y}\right) \right\} = \alpha K \quad (3)$$

$$f = \frac{1}{2\pi} \sqrt{\frac{E}{2(1+v)} \cdot \frac{y^3}{Iz} \left\{ \frac{x}{3} - \frac{64y}{\pi^5} \cdot \tanh\left(\frac{\pi x}{2y}\right) \right\}} \quad (4)$$

$$\sigma = \frac{4 \times E\alpha \tanh\left(\frac{\pi y}{2x}\right)}{\pi^2(1+v)z} \quad (5)$$

Figure 13:
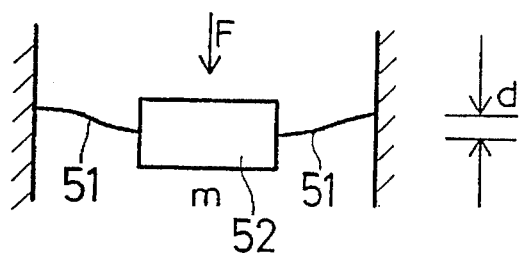
FIG. 13 is a view schematically showing an example of deflection of a post having a rectangular cross-section.
Figure 14:
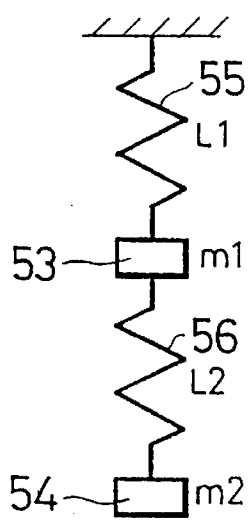
FIG. 14 is a view schematically showing a model of oscillation in Z-direction of a gimbaling mechanism element or the embodiment of FIG, 1.

In order to obtain the resonance frequency of the oscillation in the Z-axis direction, an example of torsion of a rectangle-section rod will be described below. FIG. 13 shows the case where two rectangles 51 shown in FIG. 11 support a mass body 52 having a mass m. The amount of deflection when a force "F" is exerted on the mass body 52 is expressed as "d". The force "F" is given by an equation (6) on the basis of the theory of elasticity. Then F=Ld wherein "L" is the spring constant in the deflection direction. Accordingly, the spring constant "L" is given by an equation (7).

$$F = \frac{2Exy^3 d}{z^3} \quad (6)$$

$$L = \frac{2Exy^3}{z^3} \quad (7)$$

Next, the resonance frequency is given by an equation (8) when the model with the above mentioned configuration for the oscillation of the gimbaling mechanism element in the Z-axis direction is replaced by mass bodies 53, 54 having masses $m_1$, $m_2$, respectively and coupled springs 55, 56 having spring constants $L_1$, $L_2$, respectively.

$$f = \frac{1}{2\pi} \sqrt{\frac{1}{2m_1 m_2} \left\{ m_1 L_2 + m_2(L_1 + L_2) - \sqrt{\{m_1 L_2 + m_2(L_1 + L_2)\}^2 - 4m_1 m_2 L_1 L_2} \right\}} \quad (8)$$

Considering the above, the resonance frequency of the rotation supporting portions of the gimbaling mechanism element may be expressed on the basis of the relational expressions regarding torsion and deflection of a rectangle-section rod. Since the relational expressions are different between the cases of $a \geq y$ and $a \leq y$ and between the cases of $x \geq y$ and $x \leq y$, now the cases of $a \geq y$ and $a \leq y$ will be described, and the description of the cases of $x \geq y$ and $x \leq y$ a further explanation will be given separately thereafter.

FIGS. 15A–15C shows the constitution of the gimbaling mechanism element 2 of FIG. 2. FIG. 15A is a plan view and FIGS. 15B, 15C are enlarged perspective views of the rotation supporting portions 2cx, 2cy of the X- and the Y-axis, respectively. In the rotation supporting portion 2cx of the X-axis are designated the width, thickness, length, inertia moment of rotation about the rotation supporting portion 2cx with "x", "y", "z", and $I_x$, respectively. On the other hand, in the rotation supporting portion 2cy of the Y-axis are designated the width, thickness, length, inertia moment of rotation about the rotation supporting portion 2cy with "a", "y", "L", and $I_y$, respectively. Additionally the mass of the outer frame part 2b, the mass of the inner frame part 2a, the Young's modulus of the supporting portion of the gimbaling mechanism element 2, the Poisson's ratio of the supporting portion of the gimbaling mechanism element 2, and the inclination angle of the refracting plate 1 at the time of rotation about a given axis are designated with "$M_1$", "$M_2$", "E", "v", and "α". The relational expression between the resonance frequency of the rotation supporting portion and the shape of the cross section of the rotation supporting portion is given by the equation (4). Accordingly, the resonance frequency $f_x$ of the rotational oscillation about the X-axis is given by an equation (9), while the resonance frequency $f_y$ of the rotational oscillation about the Y-axis is given by an equation (10).

$$f_x = \frac{1}{2\pi} \sqrt{\frac{Ey^3}{I_x(1+v)} \left\{ \frac{x}{3z} - \frac{64y}{\pi^5 z} \tanh\left(\frac{\pi x}{2y}\right) \right\}} \quad (9)$$

$$f_y = \frac{1}{2\pi} \sqrt{\frac{Ey^3}{I_y(1+v)} \left\{ \frac{a}{3L} - \frac{64y}{\pi^5 L} \tanh\left(\frac{\pi a}{2y}\right) \right\}} \quad (10)$$

Additionally, the resonance frequency $f_z$ of the oscillation in the Z-axis direction is given by an equation (11) derived from the equation (8).

$$f_z = \frac{1}{2\pi} \times \sqrt{\frac{Ey^3}{2m_1m_2}\left\{m_1\frac{x}{z^3} + m_2\left(\frac{x}{z^3} + \frac{a}{L^3}\right) - \sqrt{m_1^2\left(\frac{x}{z^3}\right)^2 + m_2^2\left(\frac{x}{z^3} + \frac{a}{L^3}\right)^2 - 4m_1m_2\left(\frac{ax}{z^3L^3}\right)}\right\}} \quad (11)$$

The resonance frequencies $f_x$, $f_y$ are desired to have an identical value for the purpose of simplification of designing a servo range. In the case where the values of the two are different, in view of the above-mentioned servo stability, larger one of the two values, designated with "$f_m$", is selected to satisfy the following relationship:

$$10f_m < f_z$$

Figure 16A:
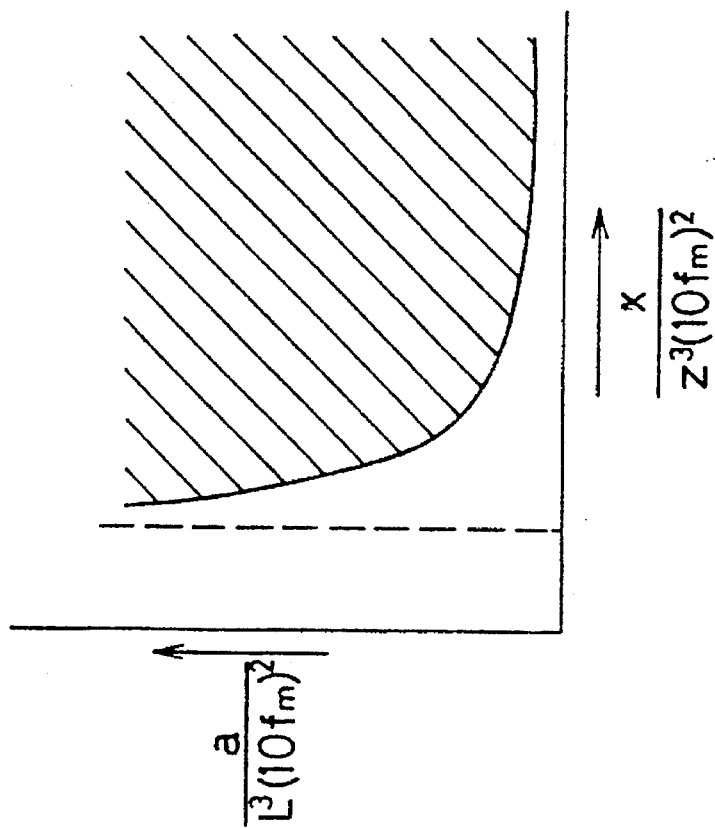
FIGS. 16A, 16B are diagrams showing regions where preferable servo characteristics are obtained in the embodiment of FIG. 1, indicated by oblique lines.

In the following the case of $f_m = 10f_x < f_y$ will be described. Assuming that $10f_x = 10f_m < f_z$ from the equation (11) and that the thickness "y" has a given value, from the relationship between $\{a/(10f_m)^2/L^3\}$ and $\{x/(10f_m)^2/z^3\}$ is established the diagonally shaded area in FIG. 16A. The relationship between the shape of the rotation supporting portion section and the shearing stress "$\sigma$" to be exerted on the rotation supporting portion when the refracting plate is inclined is given by the equation (5). Accordingly, in the case where the refracting plate is inclined by an angle of $\alpha$ about the X-axis, a maximum shearing stress $\sigma_x$ is given by the equation (12), while a maximum shearing stress $\sigma_x$ when the refracting plate is inclined by an angle of $\alpha$ about the Y-axis is given by an equation (13).

$$\sigma_x = \frac{4 \times E\alpha\tanh\left(\frac{\pi y}{2x}\right)}{\pi^2(1+v)z} \quad (12)$$

$$\sigma_y = \frac{4\alpha E\tanh\left(\frac{\pi y}{2a}\right)}{\pi^2(1+v)L} \quad (13)$$

It is necessary that the stress to be exerted on the rotation supporting sections is set to satisfy the relationship:

$$\sigma_{max} \geq \sigma_x, \sigma_y$$

wherein $\sigma_{max}$ is the fatigue limit which is a material characteristic of the rotation supporting portions. Accordingly, from the equation (12) and $\sigma_{max} \geq \sigma_x$, the length z exists within the range defined by an equation (14).

$$z \geq \frac{4 \times E\alpha\tanh\left(\frac{\pi y}{2x}\right)}{\pi^2(1+v)\sigma_{max}} \quad (14)$$

Likewise, from the equation (13) and $\sigma_{max} \geq \sigma_y$ the length L exists within the range defined by an equation (15). Additionally, from the equation (9), $\{a/(10f_x)^2/L^3\}$ and $\{x/(10f_x)^2/z^3\}$ are expressed as an equation (16) and an equation (17), respectively.

$$L \geq \frac{4aE\alpha\tanh\left(\frac{\pi y}{2a}\right)}{\pi^2(1+v)\sigma_{max}} \quad (15)$$

$$\frac{a}{L^3(10f_x)^2} = \frac{a}{L^3\left[\frac{10}{2\pi}\sqrt{\frac{Ey^3}{I_x(1+v)}}\left\{\frac{x}{3z} - \frac{64y}{\pi^5 z}\tanh\left(\frac{\pi x}{2y}\right)\right\}\right]^2} \quad (16)$$

$$\frac{x}{z^3(10f_x)^2} = \frac{x}{z^3\left[\frac{10}{2\pi}\sqrt{\frac{Ey^3}{I_x(1+v)}}\left\{\frac{x}{3z} - \frac{64y}{\pi^5 z}\tanh\left(\frac{\pi x}{2y}\right)\right\}\right]^2} \quad (17)$$

Figure 17A:
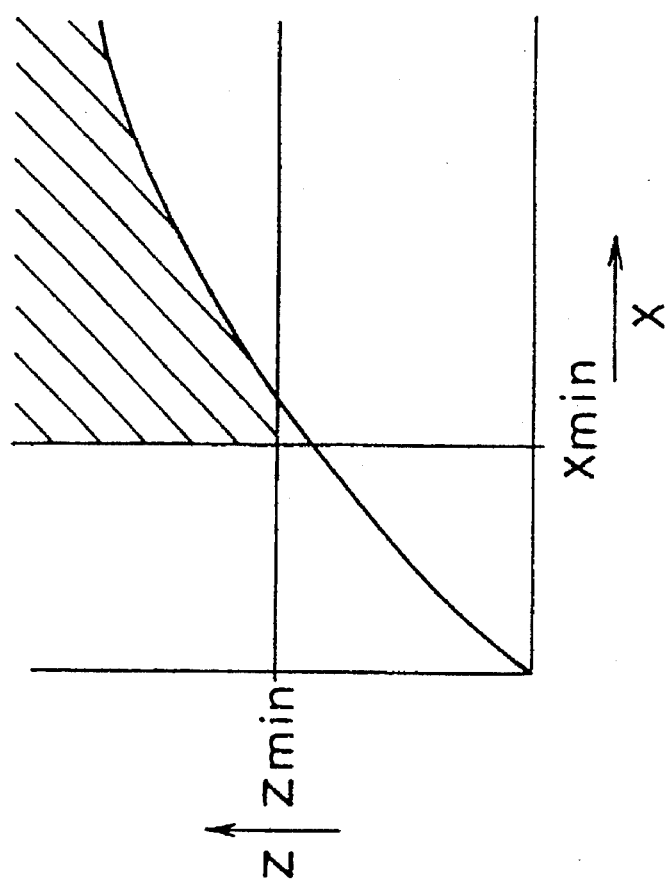
FIGS. 17A, 17B are diagrams showing regions where preferable servo characteristics are obtained in the embodiment of FIG. 1, indicated by oblique lines.
Figure 18:
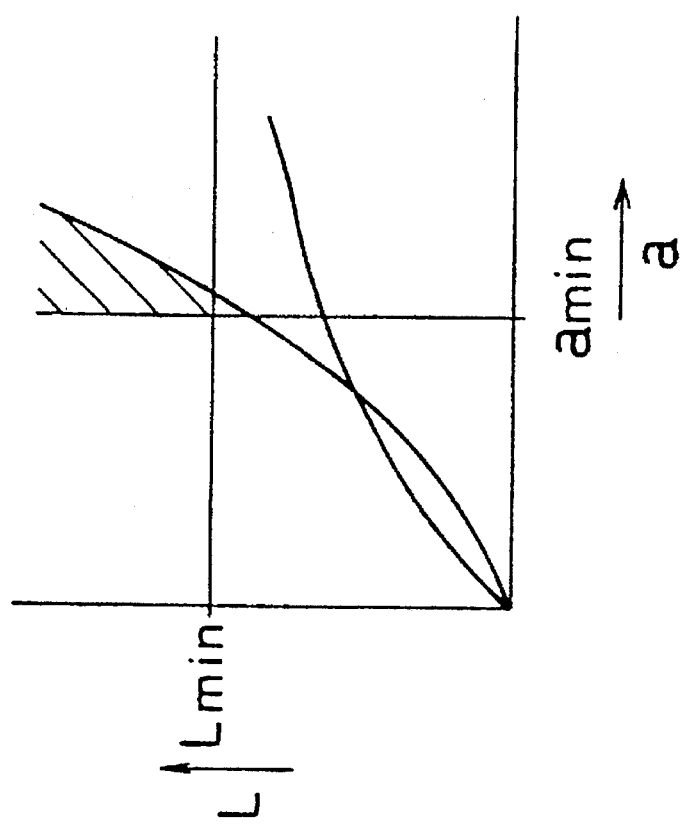
FIGS. 18A, 18B are diagrams showing regions where preferable servo characteristics are obtained in the embodiment of FIG. 1, indicated by oblique lines.
Figure 18:
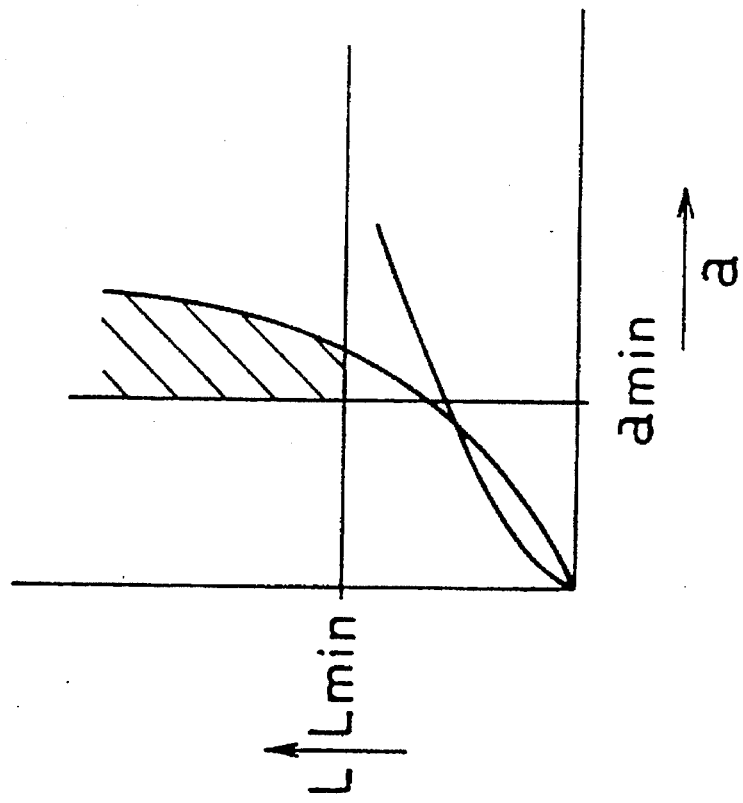

A minimum width which is determined by the limits of workable width of the rotation supporting portions is expressed as $a_{min}$ or $x_{min}$. A minimum length which is determined by the limits of workable length is expressed as $L_{min}$ or $z_{min}$. From the equation (14) and the relationships: $x \geq x_{min}$ and $z_{min}$, for example, the diagonally shaded area in FIG. 17A is established. From the equation (15) and the relationships: $f_x \geq f_y$, $a \geq a_{min}$ and $L \geq L_{min}$, the diagonally shaded area in FIG. 18A is established. The (x, z) wherein the value of the equation (17) arrives at the maximum within the diagonally shaded area in FIG. 17A is expressed by ($x_1$, $z_1$). When the ($x_1$, $z_1$) is substituted for x, z) in the equation (16), the following equation (18) is obtained:

$$\frac{a}{L^3\left[\frac{10}{2\pi}\sqrt{\frac{Ey^3}{I_x(1+v)}}\left\{\frac{x_1}{3z_1} - \frac{64y}{\pi^5 z_1}\tanh\left(\frac{\pi x_1}{2y}\right)\right\}\right]^2} \quad (18)$$

The (a, L) wherein the value of the equation (18) arrives at the maximum within the diagonally shaded area in FIG. 18A is expressed by ($a_1$, $L_1$). From (x, z)=($x_1$, $x_1$), (a, L)=($a_1$, $L_1$), the equation 16 and equation 17, maximum values of $\{a/(10f_m)^2/L^3\}$ and $\{x/(10f_m)^2/z^3\}$ are obtained as $\{a/(10f_m)^2/L^3\}_{maxa}$ and $\{x/(10f_m)^2/z^3\}_{maxa}$, respectively, and the diagonally shaded area in FIG. 19A restricted by the maximum values and the diagonally shaded area in FIG. 15A is obtained. Also in the case where $f_x \geq f_y = f_m$, $\{a/(10f_m)^2/L^3\}$ and $\{x/(10f_m)^2/z^3\}$ are restricted in the same manner as the above.

Figure 19A:
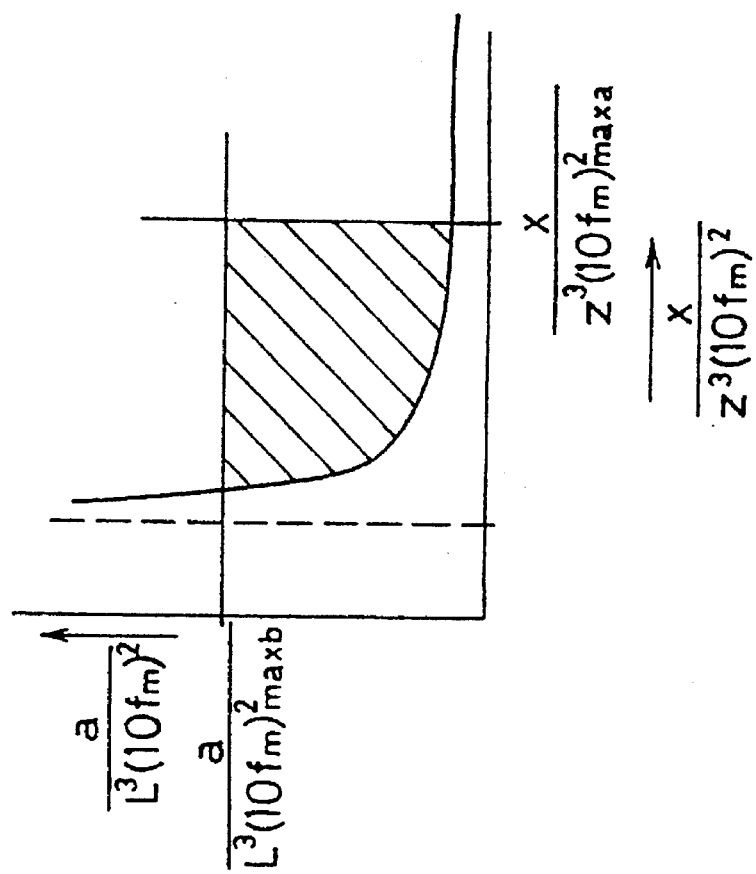
FIGS. 19A, 19B are diagrams showing regions where preferable servo characteristics are obtained in the embodiment of FIG. 1, indicated by oblique lines.

Accordingly, as long as given values for the thickness of the rotation supporting sections and the angle of inclination of the refracting plate are within the diagonally shaded area in FIG. 19A which determines the shape of the gimbaling mechanism element, a servo range for shifting of pixels may be established as desired, and driving may be performed with a high degree of reliability for a long period of time.

An explanation will now be given regarding the case where $a \leq y$ and $x \leq y$. Regarding the relational expression for the resonance frequency of the rotation supporting portions and the shape or the cross section of the rotation supporting portions, the resonance frequency $f_x$ of the rotational oscillation about the X-axis is represented by an equation (19), while the resonance frequency $f_y$ of the rotational oscillation about the Y-axis is represented by an equation (20).

$$fx = \frac{1}{2\pi} \sqrt{\frac{Ex^3}{I_x(1+v)} \left\{ \frac{y}{3z} - \frac{64x}{\pi^5 z} \tanh\left(\frac{\pi y}{2x}\right) \right\}} \quad (19)$$

$$fy = \frac{1}{2\pi} \sqrt{\frac{Ea^3}{I_y(1+v)} \left\{ \frac{y}{3L} - \frac{64a}{\pi^5 L} \tanh\left(\frac{\pi y}{2a}\right) \right\}} \quad (20)$$

In the same manner as in the above case where $a \geq y$ and $x > y$, $f_x$ and $f_y$ are desired to have an identical value for the purpose of simplification of designing a servo range. In the case where the values of the two are different, in view of the above-mentioned servo stability, larger one of the two values, designated with "$f_m$", is selected to satisfy the following relationship:

$$10 f_m \leq f_z$$

In the following the case of $f_m = 10 f_x \geq f_y$ will be described. Assuming that $10 f_x = 10 f_m \leq f_z$ from the equation (11) and that the thickness "y" has a given value, from the relationship between $\{a/(10 f_m)^2/L^3\}$ and $\{x/(10 f_m)^2/z^3\}$ is established the diagonally shaded area in FIG. 16B. In the case where the refracting plate is inclined by an angle of about the X-axis, a maximum shearing stress $\sigma_x$ is given by an equation (21), while a maximum shearing stress $\sigma_y$ when the refracting plate is inclined by an angle of $\alpha$ about the Y-axis is given by an equation (22).

$$\sigma_x = \frac{4yE\alpha\tanh\left(\frac{\pi x}{2y}\right)}{\pi^2(1+v)z} \quad (21)$$

$$\sigma_y = \frac{4yE\alpha\tanh\left(\frac{\pi a}{2y}\right)}{\pi^2(1+v)L} \quad (22)$$

It is necessary that the stress to be exerted on the rotation supporting sections is set to satisfy the relationship:

$$\sigma_{max} \geq \sigma_x, \sigma_y$$

wherein $\sigma_{max}$ is the fatigue limit which is a material characteristic of the rotation supporting portions. Accordingly, from the equation (21) and $\sigma_{max} \geq \sigma_x$, the length z exists within the range defined by an equation (23). The length L likewise exists within the range defined by an equation (24).

$$z \geq \frac{4yE\alpha\tanh\left(\frac{\pi x}{2y}\right)}{\pi^2(1+v)\sigma_{max}} \quad (23)$$

$$L \geq \frac{4yE\alpha\tanh\left(\frac{\pi a}{2y}\right)}{\pi^2(1+v)\sigma_{max}} \quad (24)$$

Additionally, from the following equation (25), $\{a/(10 f_x)^2/L^3\}$ and $\{x/(10 f_x)^2/z^3\}$ are expressed as an equation (26) and an equation (27), respectively.

$$f_x = \frac{1}{2\pi} \sqrt{\frac{Ex^3}{I_x(1+v)} \left\{ \frac{y}{3z} - \frac{64x}{\pi^5 z} \tanh\left(\frac{\pi y}{2x}\right) \right\}} \quad (25)$$

$$\frac{a}{L^3(10 f_x)^2} = \frac{a}{L^3 \left[ \frac{10}{2\pi} \sqrt{\frac{Ex^3}{I_x(1+v)} \left\{ \frac{y}{3z} - \frac{64x}{\pi^5 z} \tanh\left(\frac{\pi y}{2x}\right) \right\}} \right]^2} \quad (26)$$

$$\frac{x}{z^3(10 f_x)^2} = \frac{x}{z^3 \left[ \frac{10}{2\pi} \sqrt{\frac{Ex^3}{I_x(1+v)} \left\{ \frac{y}{3z} - \frac{64x}{\pi^5 z} \tanh\left(\frac{\pi y}{2x}\right) \right\}} \right]^2} \quad (27)$$

Figure 16B:
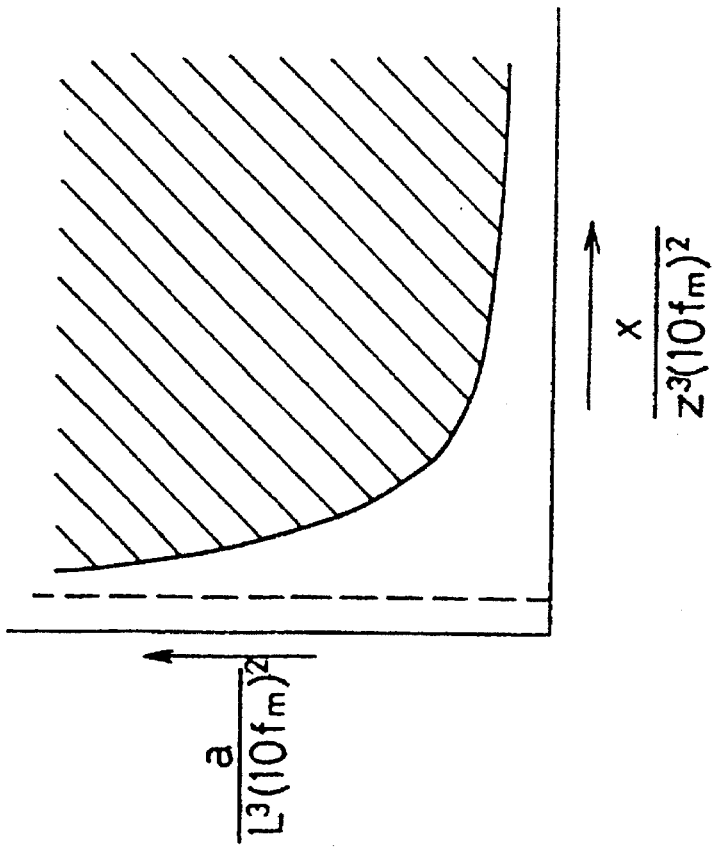
Figure 17B:
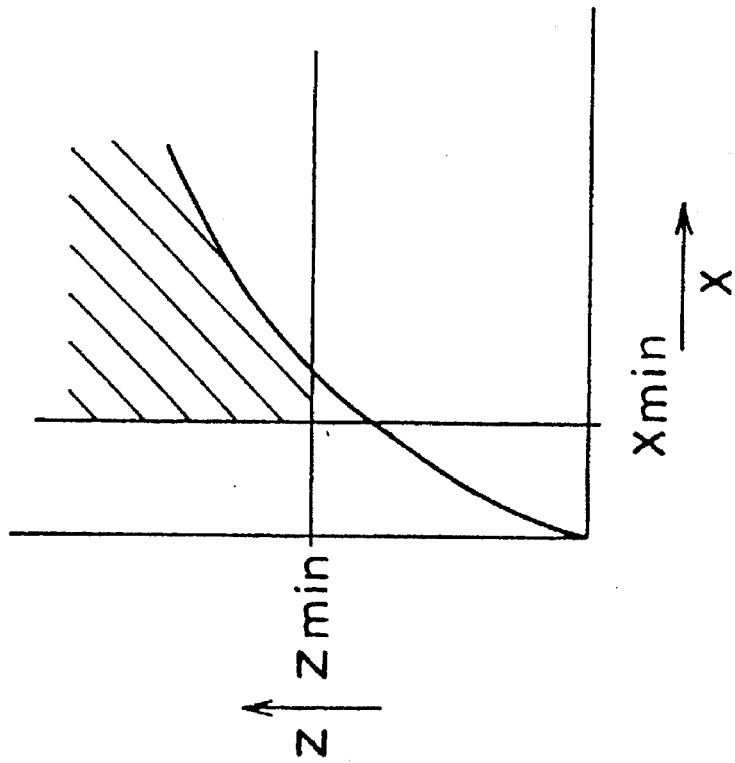
Figure 19B:
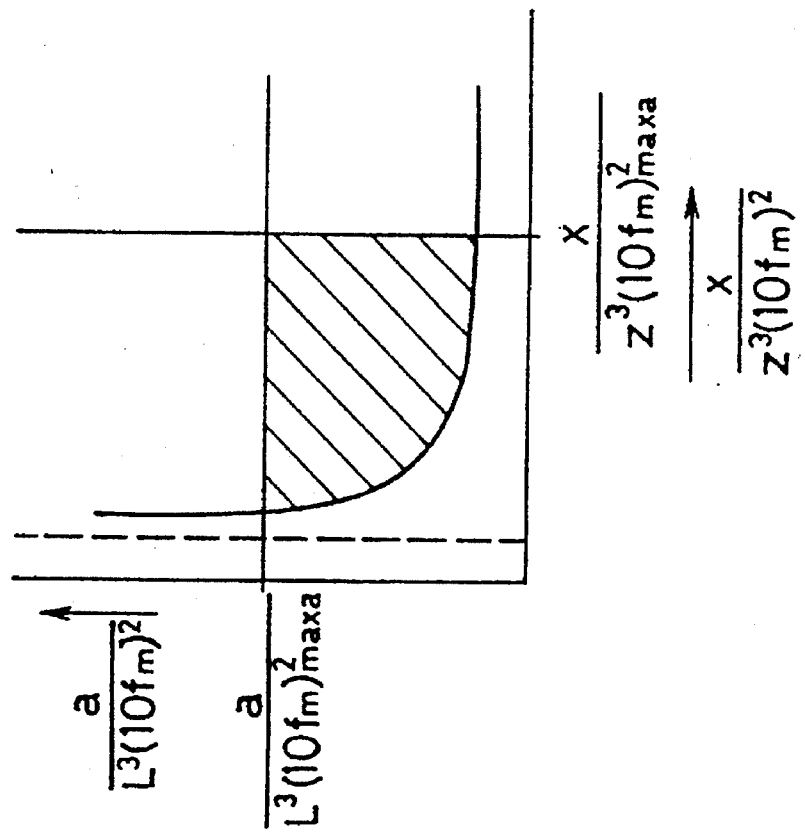

A minimum width which is determined by the limits of workable width of the rotation supporting portions is expressed as $a_{min}$ or $x_{min}$. A minimum length which is determined by the limits of workable length is expressed as $L_{min}$ or $z_{min}$. From the equation (23) and the relationships: $x \geq x_{min}$ and $z \geq z_{min}$, for example, the diagonally shaded area in FIG. 17B is established. From the equation (24) and the relationships: $f_x \geq f_y$, $a \geq a_{min}$ and $L_{min}$, the diagonally shaded area in FIG. 18B is established. The (x, z) wherein the value of the equation (27) arrives at the maximum within the diagonally shaded area in FIG. 18B is expressed by $(x_2, z_2)$. When the $(x_2, z_2)$ is substituted for (x, z) in the equation (26), the following equation (28) obtained. The (a, L) wherein the value of the equation (20) arrives at the maximum within the diagonally shaded area in FIG. 19B is expressed by $(a_2, L_2)$. From $(x, z)=(x_2, z_2)$, $(a, L)=(a_2, L_2)$, the equation (26) and the equation (27), maximum values of $\{a/(10 f_m)^2/L^3\}$ are obtained as $\{a/(10 f_m)^2/L^3\}_{maxb}$ and $\{x/(10 f_m)^2/z^3\}_{maxb}$, respectively, and the diagonally shaded area in FIG. 19B restricted by the maximum values and the diagonally shaded area in FIG. 16B is obtained.

$$\frac{a}{L^3 \left[ \frac{10}{2\pi} \sqrt{\frac{Ex_2^3}{I_x(1+v)} \left\{ \frac{y}{3z_2} - \frac{64x_2}{\pi^5 z_2} \tanh\left(\frac{\pi y}{2x_2}\right) \right\}} \right]^2} \quad (28)$$

Also in the case where $f_x \leq f_y = f_m$, $\{a/(10 f_m)^2/L^3\}$ and $\{x/(10 f_m)^2/z^3\}$ are restricted in the same manner as the above.

Accordingly, as long as given values for the thickness of the rotation supporting portions and the inclination angle of the refracting plate are within the diagonally shaded area in FIG. 19B which determines the shape of the gimbaling mechanism element, a servo range for shifting of pixels may be established as desired, and driving may be performed with a high degree of reliability for a long period of time.

The aforementioned relationships hold also for the combination of a≧y and x≦y and the combination of a≦y and x≧y, in order to establish ranges for optimum shapes of the rotation supporting sections. Although the shapes defined by a≧y and x≦y are preferred since they allow reduction in the thickness of the gimbal mechanism element and produce effects including easy workability, lower power consumption due to lower thrust attributable to decrease in the rotation-axial moment of inertia, etc., a servo stability may be established also for the case where a≦y and x≦y as mentioned above.

Considering the aforementioned points of view, with rotation supporting sections of a gimgaling mechanism element for use in ⅓-inch or ¼-inch CCD-based consumer-oriented moving or still picture camera, experiments were carried out to observe the relationship between the $\{a/(10f_m)^2/L^3\}$ and $\{x/(10f_m)^2/z^3\}$ for satisfactory servo characteristics, with results plotted in FIG. 20. Reference to FIG. 20 establishes both $2>x/(10f_m)^2/z^3>11(m^{-2}HZ^{-2})$ and $3>a/(10f_m)^2/L^3>15$ $(m^{-2}HZ^{-2})$.

As above-mentioned, FIG. 11 illustrates the serve characteristics of the embodiment of FIG. 1. If a resonance gain of oscillation in the direction of the Z-axis becomes lower, a wider range of servo characteristics is obtained. The resonance gain may be lowered by controlling the thrust of at least one of the two voice coil motors facing across a given axis of rotation.

Figure 21:
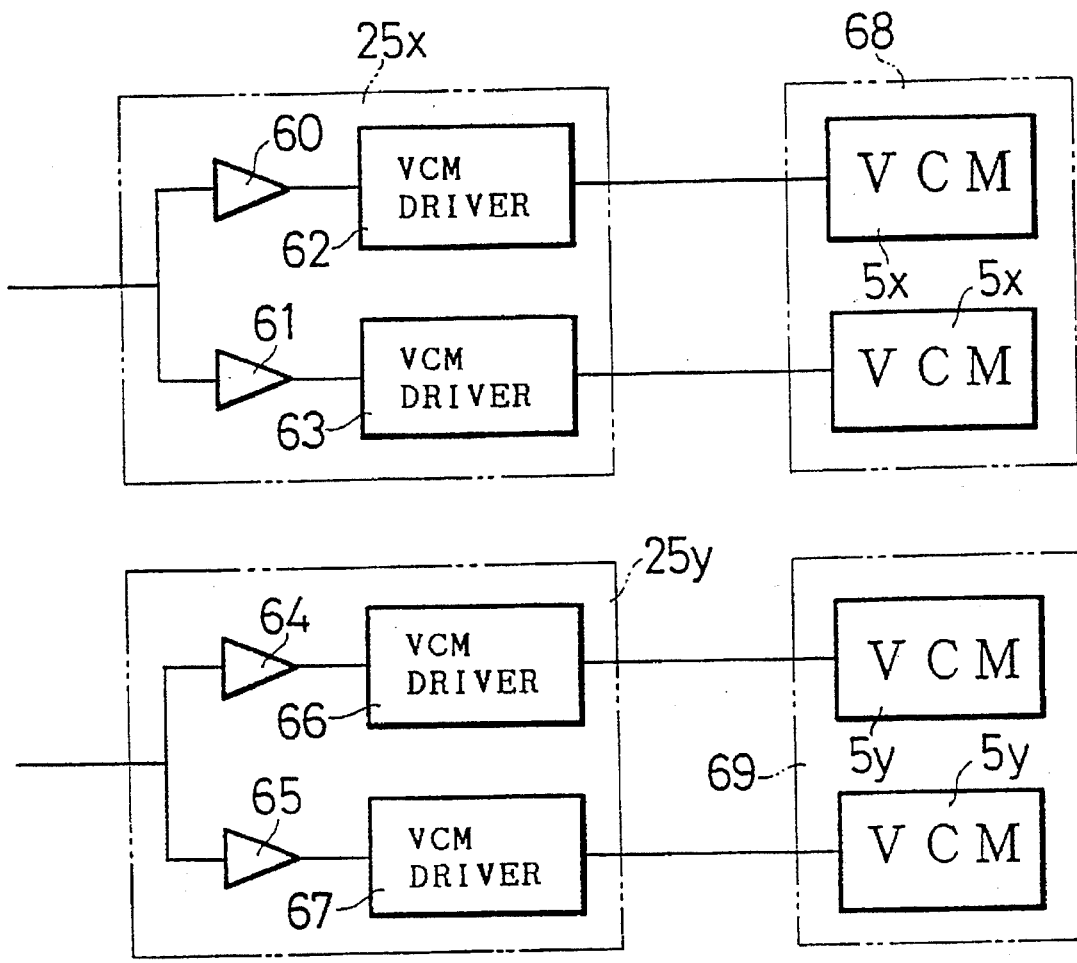
FIG. 21 is a block diagram showing a schematic electrical configuration for adjusting thrust of voice coil motors.

The following is an explanation of a method of controlling the thrust of the voice coil motors. FIG. 21 illustrates the details of the drivers 25x, 25y shown in FIG. 4 for driving the voice coil motors. Thrust controllers 60, 61 of the voice coil motors 5x, 5y drive drivers 62, 63 for driving the voice coil motors, respectively. The same as the thrust controllers means 60, 61, thrust controllers 64, 65 drive drivers 66, 67, respectively. Adjustment is made by driving either of the X- and the Y-axis of the voice coil motors. The thrust controllers 60, 61, 64, 65 are realized by using general operational amplifiers, and the voltages input to the drivers 62, 63, 66, 67 may be controlled by adjusting their gain. The drivers 62, 63, 66, 67 are general current amplification circuits, which provide the voice coil motors with current proportional to the input voltages.

An explanation will be first given regarding the rotation about the X-axis. Transfer characteristics of an open loop are measured to determine the peak height of the resonance gain 50b of oscillation in the Z-axis direction, as shown in FIG. 11. Then, a signal at whose frequency resonance occurs is input and the thrust controlling means 60 or 61 is adjusted so as to minimize the resonance gain. The adjustment made in this way allows lowering the resonance gain 50b of oscillation in the Z-axis direction to provide a wider servo range, thus improving the control characteristics. Next, also for oscillation about the Y-axis, the thrust adjusting means 64 or 65 is adjusted so as to minimize the resonance gain 50b of oscillation in the Z-axis direction. In this way servo characteristics are established over a wide range the same as in the case of the X-axis.

The configuration discussed above is that for driving two axes intersecting at right angles. With this configuration, when rotation is attempted, for example, about the X-axis, there may be caused a so-called interaction, that is, rotation about the Y-axis, in the case where the points of application of the voice coil motors are not on the Y-axis crossing the X-axis at right angles. The amount of the interaction, however, is so small that the picture quality is not adversely affected in shifting pixels, and therefore no trouble is caused.

Figure 22:
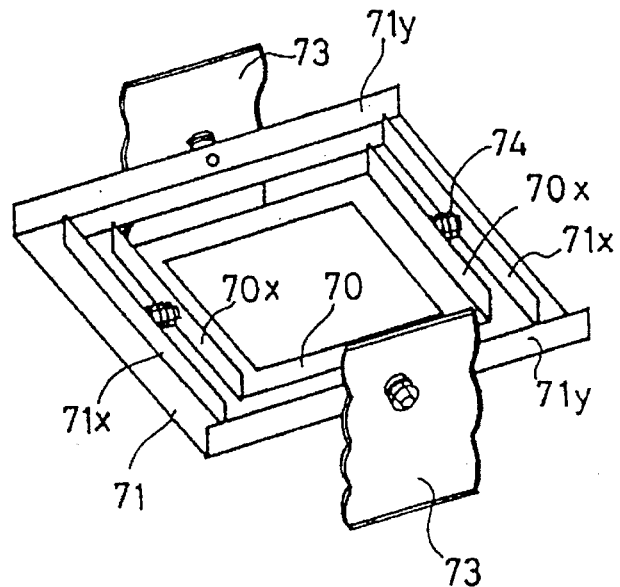
FIG. 22 is a perspective view showing a constitution of a gimbaling mechanism element of another embodiment of the invention.
Figure 23:
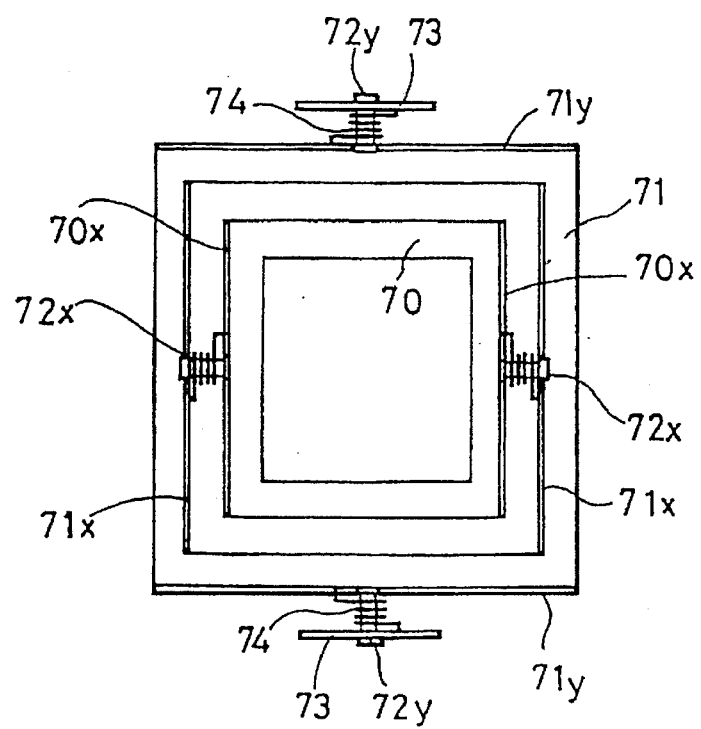
FIG. 23 is a plan view of the gimbaling mechanism element of FIG. 22.

The gimbaling mechanism element 2 of FIG. 22 and FIG. 23 show the constitution of a gimgaling mechanism element of another embodiment of the invention. The gimgaling mechanism element as shown in FIGS. 1, 2 is integratedly formed of a metal film by etching or the like, while a gimbaling mechanism element of the embodiment is constituted by combining various members. FIG. 22 is a perspective view of the gimgaling mechanism element of the embodiment, and FIG. 23 is a plan view of the gimbaling mechanism element. In the gimbaling mechanism element of the embodiment, a rectangular outer frame 71 is disposed outside a rectangular inner frame 70. Bent portions 70x are formed in the inner frame 70 by bending the perimeters of two inner-frame sides opposite to each other. In turn, the outer frame 71 is formed with bent portions 71x, 71y, of which 71x are formed by bending the inner perimeters of two outer-frame sides opposite to the two inner-frame sides, respectively, and of which 71y are formed by bending the outer perimeters of the other two outer-frame sides at right angles to the two inner-frame sides. The inner frame 70 is reinforced with its respective bent portions 70x, while the outer frame 71 is reinforced with its respective bent portions 72x, 71y.

In addition, rotation shafts 72x are attached bridging the midpoints of the bent portions 70x, 71x of the inner frame 70 and outer frame 71, and the inner frame 70 is pivotably supported with the outer frame 71 via the rotation shafts 72x. On the other hand, one end of each rotation shaft 72y is attached to the midpoint of each of the other bent sections 71y of the outer frame 71, while the other end of each rotation shaft 72y is rotatably attached to each cabinets 73. The outer frame 71 is pivotably supported with the cabinets 73 via the rotation shafts 72y.

Accordingly, the gimbaling mechanism element shown in FIGS. 22, 23 also has a freedom of biaxial rotation about the X- and the Y-axis, regarding the rotation about the respective rotation shafts 72x, 72y.

Coil springs 74 are wound around the respective rotation shafts 72x, 72y. Both ends of each coil spring 74 are fixed to the respective bent portions 70x, 71x of the inner and outer frames 70, 71 or to the bent portions 71y of the outer frame 71 and the cabinet 73. Thereby, when the pressure of the voice coil motors to the inner frame 70 is released, the inner and outer frames 70, 71 are braced so as to return to their home positions. Also in the embodiment of FIGS. 22, 23 the refracting plate 1 is fixed to the inner circumference of the inner frame 70, and the respective bobbins 7 of the four voice coil motors 5 are bonded to be fixed to the midpoints of the respective sides of the inner frame 70. As a control circuit part for driving the actuator part, it is preferable that the configuration as shown in FIG. 24 is employed for more stable operation of the actuator.

Figure 24:
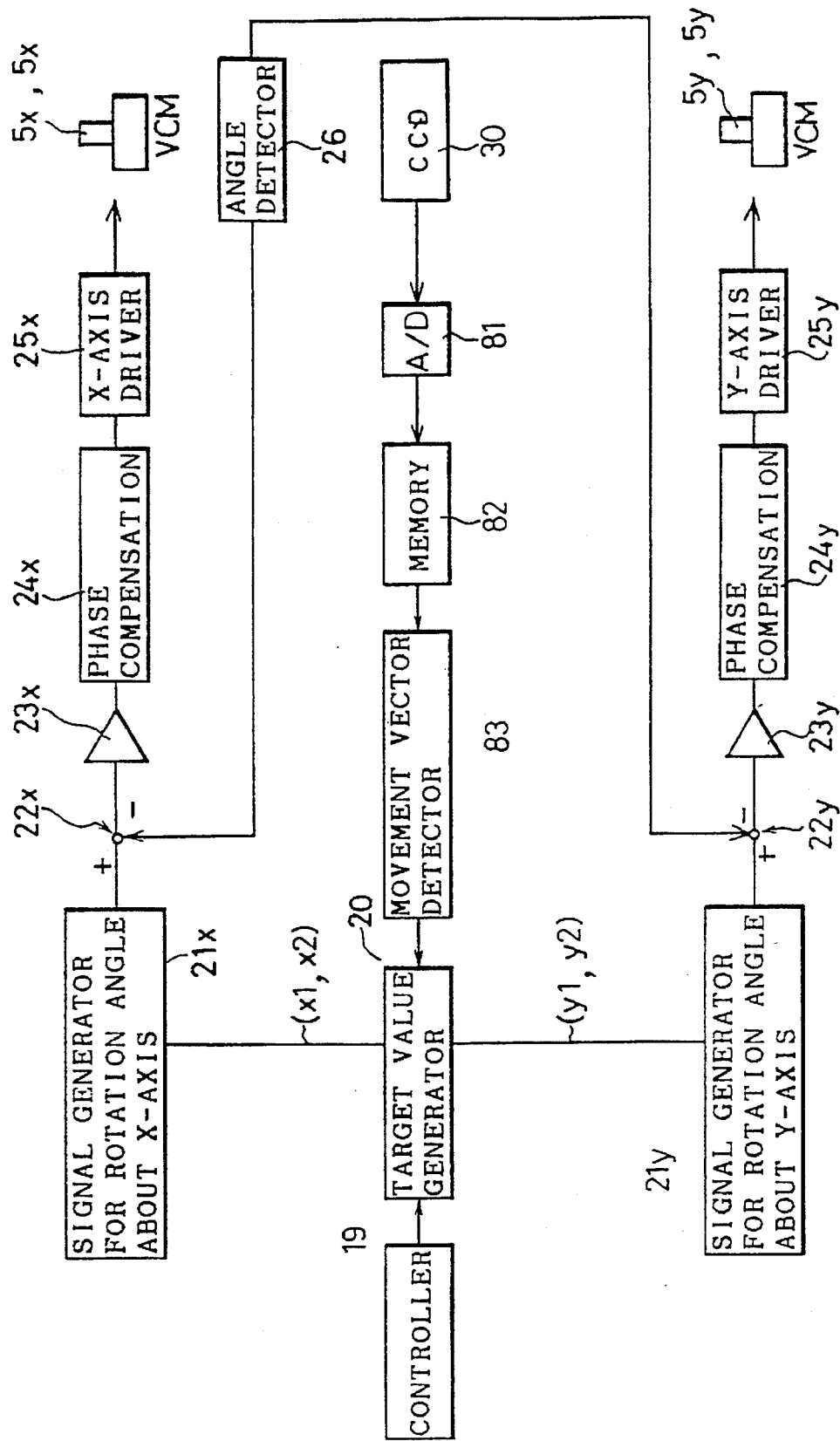
FIG. 24 is a block diagram showing an electrical constitution of a control circuit part for controlling an actuator part of still another embodiment of the invention.
Figure 25:
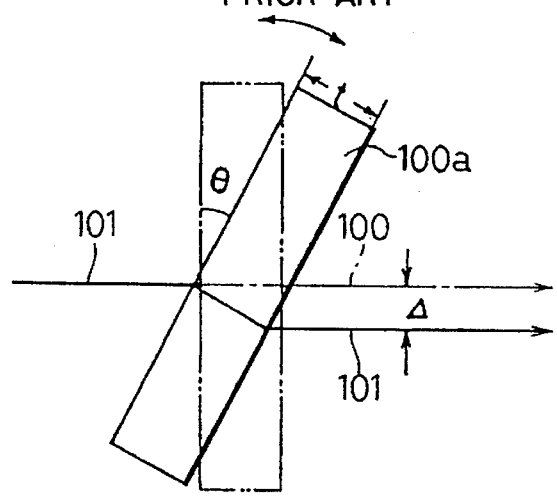
FIG. 25 is a view for explaining a principle that an image of a high resolution can be obtained by changing the inclination angle of a refracting plate.
Figure 26:
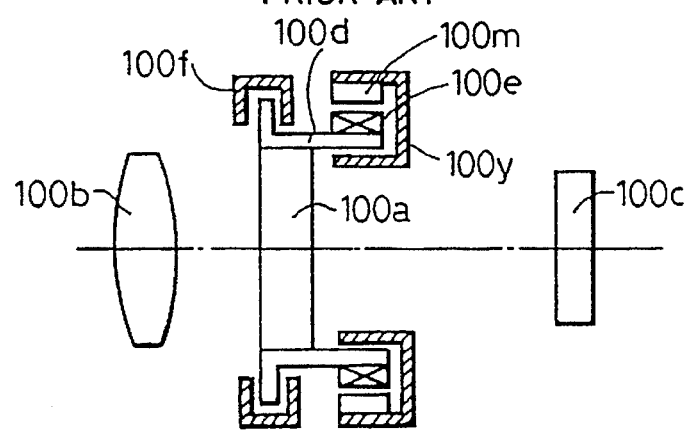
FIG. 26 is a sectional side view showing a constitution of the prior art.
Figure 27:
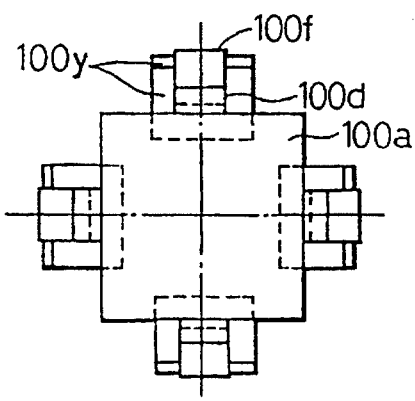
FIG. 27 is a front view showing the prior art of FIG. 26.
Figure 28:
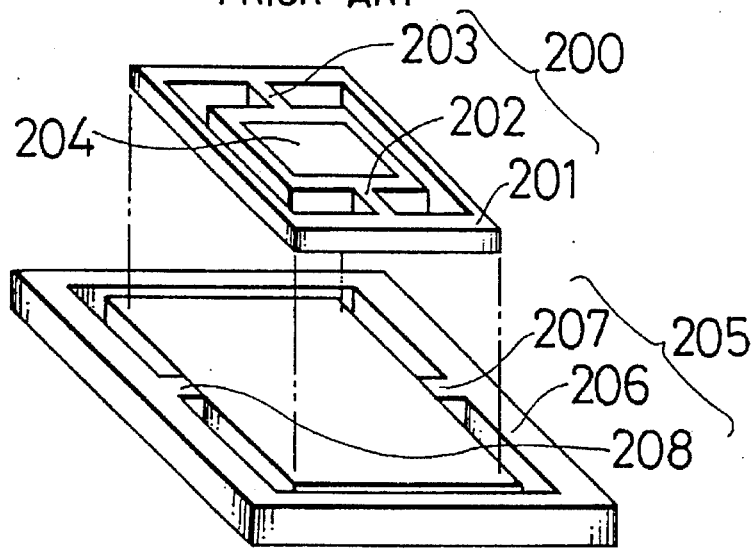
FIG. 28 is a perspective view showing a constitution of another prior art.

Regarding the configuration as shown in FIG. 24, the image data obtained by imaging the subject with the solid state imaging apparatus 30 is digitized via an A/D converter 81, and is stored in a memory 82 after being subjected to a variety of image processings. A movement vector detector 83 then makes a comparison between the image data obtained at the current angle position and the image data obtained at the immediately preceding angle position in response to the mode control signals from the controller 19 to arithmetically operate the movement vector therebetween. This calculation may be performed by, for example, any well-known technique including the representative points matching approach.

The target value generator 20 compares the vector provided by the movement vector detector 83 with the vector of the movement target value to correct the target value successively by correcting the difference. Since such correction makes possible the correction on the basis of the image data directly obtained with the solid state imaging element 62, sequential correction is carried in response to possible changes of the actuator with time and changes in a variety of constants, thus ensuring stable operation. Here, it is to be noted that the correction is not required to be continuously conducted. The correction may be conducted each time a given time elapses or only when inputting is manually performed.

Since the other components shown in FIG. 24 are the same as those shown in FIG. 4, they are designated with the same reference numerals to omit their explanation.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An imaging apparatus in which a refracting plate is arranged between a lens for condensing light from a subject and a solid state imaging element for imaging the subject, the solid state imaging element is arranged in an arrangement direction, and the refracting plate is inclined to shift the optical axis of light from said subject in the arrangement direction of the solid state imaging element, the apparatus comprising:

a gimbaling mechanism element which holds the refracting plate, said gimbaling mechanism element including rotation supporting portions for supporting the refracting plate rotatably about two rotation axes in two orthogonal directions formed in respective edge areas of the refracting plate; and a plurality of voice coil motors including movable parts capable of advancing and retreating, said movable parts being operatively connected to the respective edge areas of the refracting plate so at least two of said movable parts being positioned opposite one another about the respective rotation axes of the gimbaling mechanism element.

2. The imaging apparatus of claim 1, wherein said movable parts are respectively shaped like a bobbin.

3. The imaging apparatus of claim 1, further comprising:

target value generating means for generating a signal representing a target value for the inclination angle of the refracting plate, wherein target values for the inclination angle of the refracting plate vary in accordance with a desired resolution;

angle detecting means for detecting the inclination angle of the refracting plate held by said gimbaling mechanism element; and control means for determining a difference between the target value represented by the signal generated by the target value generating means and the inclination angle of the refracting plate detected by the angle detecting means and for controlling thrusts to advance and retreat the movable parts of the voice coil motors according to said difference.

4. The imaging apparatus of claim 3, wherein the angle detecting means includes a light emitting element and means for directing the light from the light emitting element which has been passed through or reflected on the refracting plate onto an invalid region beyond a subject imaging region of the solid state imaging element, said angle detecting means detecting the inclination angle of the refracting plate from a position of the light on the invalid region.

5. The imaging apparatus of claim 3, further comprising correction means for detecting a movement vector between images by comparing image data obtained before inclination of the refracting plate with image data obtained after inclination of the refracting plate and for outputting a signal for correcting the target value output from the target value generating means on the basis of the movement vector.

6. The imaging apparatus of claim 1, wherein said apparatus has satisfactory servo characteristic when a frequency $f_m$ satisfies the following expressions:

$$2 \leq x/(10f_m)^2/z^3 \leq 11 (m^{-2}Hz^{-2})$$

and $$3 \leq a/(10f_m)^2/L^3 \leq 15 (m^{-2}Hz^{-2})$$

wherein "z" and "x" are respectively the length and width of the rotation supporting portions of the gimbaling mechanism element in one of two orthogonal directions, namely the X-axis direction, and $f_x$ is a resonance frequency of the rotational oscillation about the X-axis; "L" and "a" are respectively the length and width of the rotation supporting portions in the other of the two orthogonal directions, namely the Y-axis direction, and $f_y$ is a resonance frequency of the rotational oscillation about the Y-axis; and $f_m$ is the larger frequency of the resonance frequencies $f_x$, $f_y$.

7. The imaging apparatus of claim 1, further comprising regulating means for making the thrust of at least one of the voice coil motors opposite one another about the respective rotations axes variable.

8. The imagine apparatus of claim 1, wherein the voice coil motors are of a moving coil type and the shapes of the sections thereof vertical to the movement directions of the cells are semicircular.

9. The imaging apparatus of claim 1, wherein said supporting portions of the gimbaling mechanism element includes an outer frame part and an inner frame part relative to the refracting plate.

10. The imaging apparatus of claim 9, wherein said inner frame part includes a first rotation supporting portion along a first of said two rotation axes and said outer frame part includes a second rotation supporting portion along a second of said two rotation axes.

11. The imaging apparatus of claim 10, wherein said first rotation supporting portion is thinner than said inner frame part and said second rotation supporting portion is thinner than said outer frame part.

12. The imaging apparatus of claim 9, further comprising a reinforcing plate fixed to said gimbaling mechanism element.

13. The imaging apparatus of claim 9, wherein said reinforcing plate is fixed between said inner frame part and the refracting plate.

14. The imaging apparatus of claim 4, wherein the angle detecting means includes a reflection type or transmission type photointerrupter including a light emitting element and a light receiving element.

15. A method for inclining a refracting plate to shift an optical axis of light from a subject relative to an arrangement of a solid state imaging element comprising the steps of:

supporting the refracting plate rotatably about two orthogonal rotation axes;

positioning movable elements along said two rotation axes; and moving said movable elements in a direction orthogonal to both of said two rotation axes, thereby providing inclination of the refracting plate relative to the solid state imaging element.

16. The method of claim 15, further comprising:

generating a signal representing a target value for the inclination angle of the refracting plate;

varying target values for the inclination angle of the refracting plate in accordance with a desired resolution;

ascertaining the inclination angle of the refracting plate;

determining a difference between the target value represented by the signal output from said generating step and the inclination angle of the refracting plate detected by said ascertaining step; and controlling thrusts to advance and retreat the movable elements in accordance with said difference output by said determining step.

17. The method of claim 16, wherein said ascertaining step includes:

emitting light from a light emitting element;

directing the light from the light emitting element which has been passed through or reflected on the refracting plate onto an invalid region beyond a subject imaging region of the solid state imaging element; and detecting the inclination angle of the refracting plate from a position of the light on the invalid region.

18. The method of claim 16, further comprising:

comparing current image data obtained before inclination of the refracting plate with image data obtained after inclination of the refracting plate;

determining a movement vector between image in accordance with said comparing step; and correcting the target value output from said generating step on the basis of the movement vector.

19. The method of claim 15, further comprising reinforcing said supporting step.

20. The method of claim 15, further comprising restricting said inclination to be about said two rotation axes.

21. The method of claim 15, wherein said positioning step includes positioning at least two movable elements opposite to one another about respective rotation axes, and said moving step includes moving opposite movable elements in opposite directions, thereby providing inclination of the refracting plate.

22. The method of claim 17, wherein said detecting step uses an angle detector, including a reflection type or transmission type photointerrupter including a light emitting element and a light receiving element.

* * * * *